US012621358B2

(12) United States Patent
Burd et al.

(10) Patent No.: US 12,621,358 B2
(45) Date of Patent: May 5, 2026

(54) METHODS AND SYSTEMS FOR VERBAL POLLING DURING A CONFERENCE CALL DISCUSSION

(71) Applicant: Google LLC, Mountain View, CA (US)

(72) Inventors: Emily Burd, New York, NY (US); Akshat Sharma, Cambridge, MA (US)

(73) Assignee: Google LLC, Mountain View, CA (US)

( * ) Notice: Subject to any disclaimer, the term of this patent is extended or adjusted under 35 U.S.C. 154(b) by 149 days.

(21) Appl. No.: 18/497,948

(22) Filed: Oct. 30, 2023

(65) Prior Publication Data

US 2024/0080351 A1 Mar. 7, 2024

Related U.S. Application Data

(63) Continuation of application No. 17/538,593, filed on Nov. 30, 2021, now Pat. No. 11,805,159.

(60) Provisional application No. 63/236,570, filed on Aug. 24, 2021.

(51) Int. Cl.
*H04L 65/403* (2022.01)
*H04N 21/4788* (2011.01)

(52) U.S. Cl.
CPC ....... *H04L 65/403* (2013.01); *H04N 21/4788* (2013.01)

(58) Field of Classification Search
CPC .......................... H04N 21/4788; H04L 65/403
See application file for complete search history.

(56) References Cited

U.S. PATENT DOCUMENTS

| | | | |
|---|---|---|---|
| 6,581,071 B1 | 6/2003 | Gustman et al. | |
| 8,488,916 B2 | 7/2013 | Terman | |
| 10,176,808 B1 | 1/2019 | Lovitt et al. | |
| 10,424,297 B1 | 9/2019 | Carino | |
| 10,452,652 B2 | 10/2019 | Hernandez Sanchez et al. | |
| 11,250,857 B1 * | 2/2022 | Kim ........................ G10L 15/22 |
| 11,314,761 B1 | 4/2022 | Yestrau et al. | |

(Continued)

FOREIGN PATENT DOCUMENTS

| | | |
|---|---|---|
| CN | 105447578 A | 3/2016 |
| CN | 106664240 A | 5/2017 |

(Continued)

OTHER PUBLICATIONS

Extended European Search Report Serial No. EP 23 20 8880, dated Jan. 15, 2024, 7 pages.

(Continued)

*Primary Examiner* — Amal S Zenati
(74) *Attorney, Agent, or Firm* — Lowenstein Sandler LLP

(57) ABSTRACT

One or more content streams are obtained from a client device associated with a participant during a conference call. The one or more content streams indicate verbal phrases provided by the participant during the conference call. At least a portion of the one or more content streams are fed as input to a machine learning model. A polling question for polling other participants of the conference call and one or more answer options corresponding to the polling question are determined based on one or more outputs of the machine learning model. The polling question and the one or more answer options are provided for polling the other participants via one or more client devices associated with the other participants.

20 Claims, 12 Drawing Sheets

(56)                References Cited

U.S. PATENT DOCUMENTS

| | | | |
|---|---|---|---|
| 11,328,796 | B1 | 5/2022 | Jain et al. |
| 11,755,181 | B2 | 9/2023 | Burd et al. |
| 11,838,448 | B2 | 12/2023 | Burd et al. |
| 2002/0085030 | A1 | 7/2002 | Ghani |
| 2006/0286530 | A1 | 12/2006 | Forrest et al. |
| 2007/0100938 | A1 | 5/2007 | Bagley et al. |
| 2008/0120101 | A1* | 5/2008 | Johnson .............. H04L 12/1822 |
| | | | 704/E15.04 |
| 2008/0146342 | A1 | 6/2008 | Harvey et al. |
| 2011/0231226 | A1 | 9/2011 | Golden |
| 2011/0271204 | A1 | 11/2011 | Jones et al. |
| 2013/0166279 | A1 | 6/2013 | Dines et al. |
| 2013/0339091 | A1 | 12/2013 | Humay |
| 2014/0229866 | A1 | 8/2014 | Gottlieb |
| 2015/0206156 | A1 | 7/2015 | Tryfon et al. |
| 2016/0034162 | A1 | 2/2016 | Atamel et al. |
| 2016/0044226 | A1 | 2/2016 | Williams |
| 2016/0078458 | A1 | 3/2016 | Gold et al. |
| 2016/0086605 | A1 | 3/2016 | Kim et al. |
| 2017/0004515 | A1 | 1/2017 | Wilmot et al. |
| 2017/0214723 | A1 | 7/2017 | Sanso et al. |
| 2018/0122256 | A1 | 5/2018 | Smith et al. |
| 2018/0189382 | A1 | 7/2018 | Mowatt |
| 2018/0232752 | A1 | 8/2018 | Badereddin et al. |
| 2018/0359530 | A1 | 12/2018 | Marlow et al. |
| 2019/0028520 | A1 | 1/2019 | Nawrocki |
| 2019/0073348 | A1 | 3/2019 | Cheesman |
| 2019/0088153 | A1 | 3/2019 | Bader-Natal et al. |
| 2019/0124128 | A1 | 4/2019 | Bader-Natal et al. |
| 2020/0042916 | A1 | 2/2020 | Jaiswal et al. |
| 2020/0074294 | A1 | 3/2020 | Long et al. |
| 2020/0074873 | A1 | 3/2020 | Alsarhan et al. |
| 2020/0334697 | A1 | 10/2020 | Badereddin et al. |
| 2020/0380468 | A1 | 12/2020 | Crawford et al. |
| 2021/0150155 | A1 | 5/2021 | Kim et al. |
| 2021/0150385 | A1 | 5/2021 | Mallette et al. |
| 2021/0191925 | A1 | 6/2021 | Sianez |
| 2021/0279622 | A1 | 9/2021 | Bui et al. |
| 2021/0377063 | A1 | 12/2021 | Cutler et al. |
| 2021/0406292 | A1 | 12/2021 | Burd et al. |
| 2022/0066603 | A1 | 3/2022 | Burd et al. |
| 2022/0114142 | A1 | 4/2022 | Madisetti et al. |
| 2022/0138470 | A1 | 5/2022 | Seleskerov et al. |
| 2024/0079000 | A1 | 3/2024 | Fernández Musoles et al. |

FOREIGN PATENT DOCUMENTS

| | | |
|---|---|---|
| JP | H09281991 A | 10/1997 |
| WO | 2022006144 A2 | 1/2022 |

OTHER PUBLICATIONS

Grosvenor C., "Family Feud: The Rules of the Game, Decades on this Game Show Still Draws Viewers," Liveabout, Sep. 25, 2018, pp. 1-3, [Retrieved on Oct. 22, 2021] Retrieved from URL: https://www.liveabout.com/family-feud-brief-overview-1396911.

Heinrich S., "Quiplash: New Party Game Expands "Audience" Participation to 10000," Playstation Blog, Jun. 30, 2015, pp. 1-4, [Retrieved on Oct. 22, 2021] Retrieved from URL: https://blog.playstation.com/2015/06/30/quiplash-new-party-game-expands-audience-participation-to-10000/.

International Search Report and Written Opinion for Application No. PCT/US2022/041592, mailed on Mar. 16, 2023, 23 pages.

International Search Report and Written Opinion for International Application No. PCT/US2021/039668, mailed Jan. 20, 2022, 20 Pages.

International Search Report and Written Opinion for International Application No. PCT/US2022/041412, mailed Dec. 9, 2022, 17 Pages.

Chung J., et al., "Detecting Interrogative Utterances with Recurrent Neural Networks," arXiv.org, Nov. 1, 2015 (Nov. 1, 2015), pp. 1-6. Retrieved from the Internet: URL:https://arxiv.org/pdf/1511.01042v2.

Office Action for Chinese Patent Application No. 202180046380.0, mailed Feb. 15, 2025, 21 Pages.

Office Action for European Patent Application No. 22783092.4, mailed Oct. 9, 2025, 9 Pages.

\* cited by examiner

CONFERENCE PLATFORM 120

CONFERENCE MANAGEMENT COMPONENT 122

POLLING ENGINE 151

POLLING QUESTION 124

POLLING ANSWER 126

NETWORK 104

DATA STORE 110

CLIENT 102N

CLIENT 102A

100

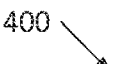

400

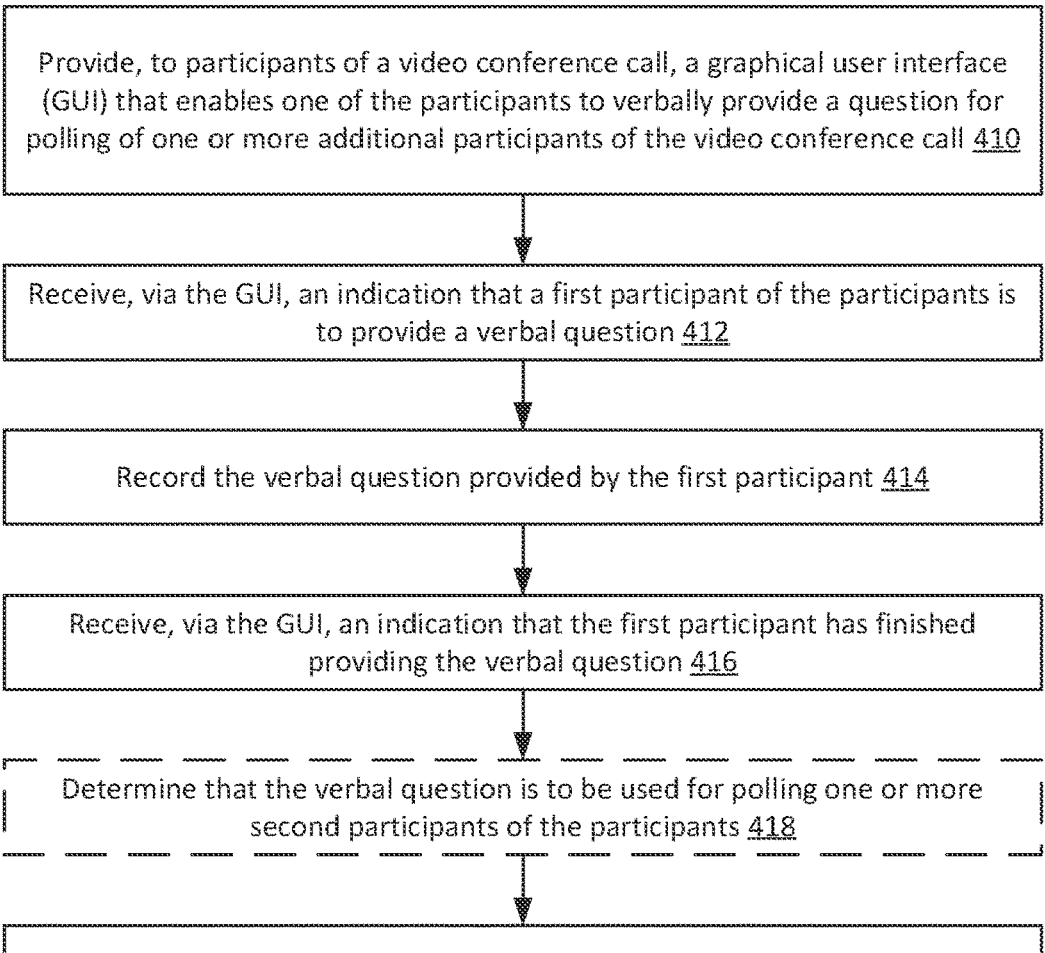

Provide, to participants of a video conference call, a graphical user interface (GUI) that enables one of the participants to verbally provide a question for polling of one or more additional participants of the video conference call 410

Receive, via the GUI, an indication that a first participant of the participants is to provide a verbal question 412

Record the verbal question provided by the first participant 414

Receive, via the GUI, an indication that the first participant has finished providing the verbal question 416

Determine that the verbal question is to be used for polling one or more second participants of the participants 418

Provide a textual form of the verbal question to the one or more second participants in the GUI 420

FIG. 4

METHODS AND SYSTEMS FOR VERBAL POLLING DURING A CONFERENCE CALL DISCUSSION

RELATED APPLICATIONS

This continuation application claims priority to U.S. patent application Ser. No. 17/538,593 filed on Nov. 30, 2021 and entitled "METHODS AND SYSTEMS FOR VERBAL POLLING DURING A CONFERENCE CALL DISCUSSION," which claims the benefit of U.S. Provisional Patent Application No. 63/236,570 filed on Aug. 24, 2021 and entitled "METHODS AND SYSTEMS FOR VERBAL POLLING DURING A CONFERENCE CALL DISCUSSION," which is incorporated by reference herein.

TECHNICAL FIELD

Aspects and implementations of the present disclosure relate to methods and systems for verbal polling during a conference call discussion.

BACKGROUND

Video or audio-based conference call discussions can take place between multiple participants via a conference platform. A conference platform includes tools that allow multiple client devices to be connected over a network and share each other's audio data (e.g., voice of a user recorded via a microphone of a client device) and/or video data (e.g., a video captured by a camera of a client device, or video captured from a screen image of the client device) for efficient communication. A conference platform can also include tools to allow a participant of a conference call to pose a question to other participants (e.g., via a conference platform user interface (UI)) during the conference call discussion to solicit responses (referred to as polling). The conference platform can collect responses provided by the other participants and generate polling results.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a method and system are disclosed for verbal polling during a conference call discussion. In an implementation, a user interface (UI) is provided to participants of a video conference call. The UI enables one of the participants to verbally provide a question for polling of one or more additional participants of the participants. An indication that a first participant is to provide a verbal question is received via the UI. The verbal question provided by the first participant is recorded. An indication that the first participant has finished providing the verbal question is received via the UI. A determination is made that the verbal question is to be used for polling of second participants of the video conference call. A textual form of the verbal question is provided to the one or more second participants of the video conference call in the UI.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flow diagram of a method for verbal polling via a UI provided by a conference platform, in accordance with implementations of the present disclosure.

DETAILED DESCRIPTION

Figure 1:
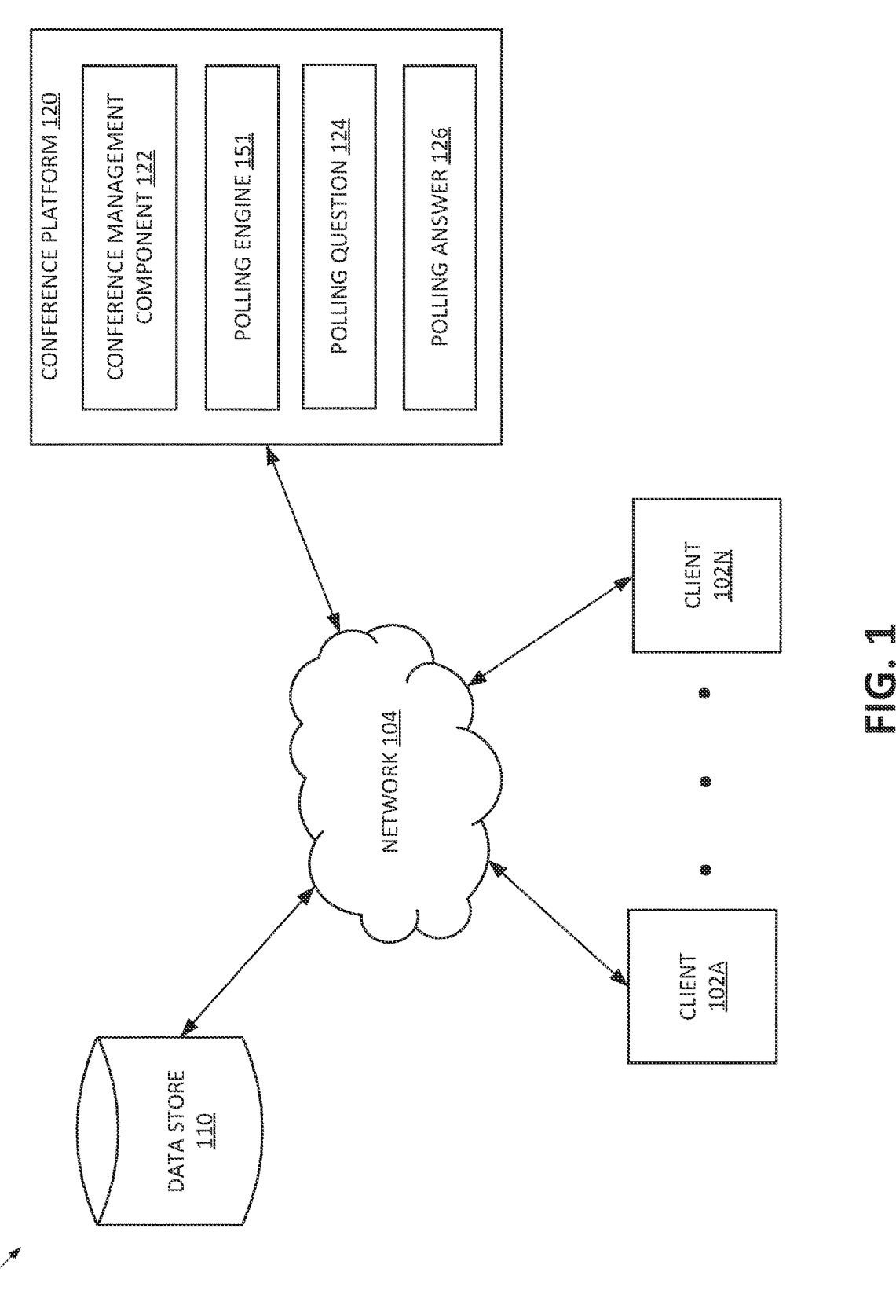
FIG. 1 illustrates an example system architecture, in accordance with implementations of the present disclosure.

Aspects of the present disclosure relate to verbal polling during a conference call discussion. A conference platform can enable video or audio-based conference call discussions between multiple participants via respective client devices that are connected over a network and share each other's audio data (e.g., voice of a user captured via a microphone of a client device) and/or video data (e.g., a video captured by a camera of a client device) during a conference call. In some instances, a conference platform can enable a significant number of client devices (e.g., up to one hundred or more client devices) to be connected via the conference call.

A participant of a conference call may want to pose a question to the other participants of the conference call to solicit responses from the other participants (referred to herein as polling). The participant can provide a polling question during the conference call and the conference platform can collect responses provided by other participants of the conference call. Some existing conference platforms can provide a user interface (UI) to each client device connected to the conference call, where the UI displays the video data and/or audio data shared over the network, and can also display messages exchanged between participants during the conference call. The participant that wants to pose a polling question can pose the polling question to the other participants by causing the client devices associated with the other participants to display a message based on the polling question. For example, the participant can select a polling option in the UI of the conference platform and type the polling question in a designated area of the conference platform UI at a client device. In response to receiving the polling question, the conference platform can generate a message based on the polling question and cause the message to be displayed via the conference platform UI at the client devices associated with the other participants.

Conventionally, a conference call participant that wants to pose a polling question to the other participants can think of the polling question prior to the conference call and pose the polling question via the conference platform UI at a particular instance of the discussion. However, an introduction of a pre-determined polling question during a conference call can interrupt an organization or a natural flow of the conference call discussion and can increase the length of the discussion. In some instances, a conference call participant can think of the polling question based on the discussion between participants of the conference call. To poll the other participants using the polling question, the participant can ask the other participants to pause the discussion, provide the polling question via the conference platform UI at the client device, and cause the polling question to be displayed to the other participants, as previously described. However, the process to provide the polling question via the conference platform UI and cause the polling question to be displayed to the other participants can take a significant amount of time (e.g., minutes). If multiple polling questions are posed to participants of the conference call, the length of the conference call discussion can increase significantly. Further, an organization and/or a natural flow of the conference call discussion can be interrupted and participants may be unable to efficiently discuss each topic for the conference call. By increasing the length of the conference call discussion, additional system resources are utilized to facilitate the connection between the client devices associated with each participant. Therefore, fewer system resources are available to other processes, both on the client devices and computing devices hosting the conference platform, reducing an overall efficiency and increasing an overall latency for the client devices and the computing devices.

Implementations of the present disclosure address the above and other deficiencies by providing audio-based polling during a conference call discussion. A conference platform can enable client devices to connect participants to a video-based conference call, an audio-based conference call, and/or a hybrid conference call via a network. A video-based conference call refers to a conference call where the respective client devices of each participant to the conference call generate audio data (e.g., voice of the participant captured via a microphone of the respective client device) and video data (e.g., a video captured by a camera of the respective client device) during the conference call discussion. An audio-based conference call refers to a conference call where the respective client devices of each participant of the conference call generate audio data and not video data during the conference call discussion. A hybrid conference call refers to a conference call where the respective client devices of some participants to the conference call generate audio data and video data during the conference call (referred to as video participants herein), and the respective client devices of other participants to the conference call generate audio data and not video data during the conference call (referred to as audio participants herein). In some embodiments, video participants can connect with other video participants and/or audio participants via a user interface (UI) provided by the conference platform (referred to as a conference UI herein). In some embodiments, audio participants can connect with other audio participants and/or video participants via a conference UI, a UI provided by another application running on respective client devices associated with the audio participants (referred to as an application UI herein), and/or using other telecommunication techniques (e.g., by dialing a telephone number and/or conference identification number designated for the conference call via a keypad of a telephone device).

In some embodiments of the present disclosure, a conference platform can provide a UI (i.e., a conference UI) to one or more participants of a video conference call discussion and/or a hybrid conference call discussion. The conference UI can enable one of the participants to verbally provide a question for polling other participants of the video conference call and/or the hybrid conference call (referred to simply as a conference call herein). The conference platform can detect that a participant of the conference call is to provide a verbal question and can initiate (e.g., at the client device associated with the participant) recording of the verbal question provided by the participant. In some embodiments, the conference platform can detect that the participant is to provide the verbal question by receiving a notification indicating that the participant is to provide the verbal question. For example, the conference UI can include a polling question UI element. A participant of the conference call can engage with the polling question UI element via the conference UI prior to providing the verbal question. The client device associated with the participant can detect that the participant has engaged with the polling question UI element and, in some embodiments, can transmit a notification to the conference platform indicating that the participant has engaged with the polling question UI element. In response to receiving the notification, the conference platform can initiate recording of the verbal question provided by the participant (e.g., via a microphone included at or coupled to the client device associated with the participant).

The conference platform can detect that the first participant has finished providing the verbal question and determine whether the verbal question is to be used for polling one or more of the other participants of the conference call. In some embodiments, the conference platform can detect that the participant has finished providing the verbal question by receiving another notification that indicates that the participant has finished providing the verbal question. For example, the client device associated with the participant can detect that the participant has disengaged with the polling question UI element and/or has re-engaged with the polling question UI element and can transmit another notification to the conference platform indicating that the participant has disengaged and/or re-engaged with the polling question UI element. In response to receiving the notification, the conference platform can terminate recording of the audio provided by the participant. In some embodiments, the conference platform can determine that the verbal question is to be used for polling one or more other participants of the conference call based on the indication that the participant engaged with the polling question UI element. In other or similar embodiments, the conference platform can convert an audio file including the recording of the verbal question into one or more text strings and identify the textual form of the verbal question from the one or more text strings. The conference platform can provide the textual form of the verbal question to the participant via the conference UI at the client device associated with the participant. The conference platform can also provide one or more additional UI elements via the conference UI that inquire whether the participant would like to pose the textual form of the verbal question for polling of the one or more other participants of the conference call. The participant can provide a response to the inquiry by interacting with the one or more additional UI elements provided via the conference UI.

In response to determining that the verbal question is to be used for polling the one more other participants of the conference call, the conference platform can provide the textual form of the question to the one or more other participants in the conference UI at the respective client devices associated with the other participants. For example, at each respective client device associated with the one or more other participants, the conference platform can update the conference UI to include an indication of the textual form of the polling question. In some embodiments, the conference platform can also update the conference UI to include one or more UI elements that enable the other participants to provide a response to the polling question. For example, the conference platform can update the conference UI to include one or more UI elements that enable the other participants to provide a verbal response to the polling question. In response to detecting that a participant has engaged with the one or more UI elements via the conference UI at a respective client device, the conference platform can record a verbal answer to the polling question provided by the participant and can terminate recording of the verbal answer responsive to detecting that the participant has disengaged and/or re-engaged with the one or more UI elements. In another example, the conference platform can update the conference UI to include one or more UI elements (e.g., a text box) that enable the other participants to provide a textual response to the polling question. In response to receiving a response (e.g., a verbal response, a textual response, etc.) to the polling question, the conference platform can provide the response (e.g., via the conference UI) to the participant that posed the polling question and/or an organizer of the conference call.

Aspects of the present disclosure provide a mechanism for assisting a participant of a conference call with verbally posing a question for polling other participants of the conference call in an effective and seamless manner. During a conference call, a participant of the conference call can engage with a UI element that is configured to initiate audio-based polling of other participants of the conference call. Responsive to engaging with the UI element, the participant can provide the polling question verbally and disengage and/or re-engage with the UI element when the participant is finished providing the polling question. The conference platform can detect that the participant has provided a verbal polling question and can automatically provide a textual form of the verbal polling question to the other participants of the conference call via the conference UI. Accordingly, a participant that wants to pose a polling question to the other participants does not interrupt the organization or the natural flow of the conference call by asking the other participants to pause the discussion while the participant provides a textual form of a polling question via the conference platform UI. Thus, the participants of the conference call can efficiently conduct the conference call discussion with a reduced number of interruptions, thereby reducing the length of the conference call discussion. As a result of reducing the length of a conference call discussion, the amount of system resources utilized to facilitate the connection between client devices associated with each participant is decreased. Therefore, more system resources are available at the client devices and other computing devices for other processes, resulting in an increase of overall efficiency and a decrease in overall latency.

FIG. 1 illustrates an example system architecture 100, in accordance with implementations of the present disclosure. The system architecture 100 (also referred to as "system" herein) includes client devices 102A-N, a data store 110, and a conference platform 120 each connected to a network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video data, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by conference platform 120 or one or more different machines (e.g., server machines 130-150) coupled to the conference platform 120 via network 104.

Conference platform 120 can enable users of client devices 102A-N to connect with each other via a conference call, such as a video conference call or an audio conference call. A conference call refers to an audio-based call and/or a video-based call in which participants of the call can connect with multiple additional participants. Conference platform 120 can allow a user to join and participate in a video conference call and/or an audio conference call with other users of the platform. Although embodiments of the present disclosure refer to multiple participants (e.g., 3 or more) connecting via a conference call, it should be noted that embodiments of the present disclosure can be implemented with any number of participants connecting via the conference call (e.g., 2 or more).

The client devices 102A-N may each include computing devices such as personal computers (PCs), laptops, mobile phones, smart phones, tablet computers, netbook computers, network-connected televisions, etc. In some implementations, client devices 102A-N may also be referred to as "user devices." Each client device 102A-N can include a web browser and/or a client application (e.g., a mobile application or a desktop application). In some implementations, the web browser and/or the client application can display a user interface (UI), provided by conference platform 120, for users to access conference platform 120. Such UI may be referred to as a conference UI or conference GUI herein. In one example, a user can join and participate in a video conference call or an audio conference call via a UI provided by conference platform 120 and presented by the web browser or client application.

In some embodiments, client device 102A-N can include an audiovisual component that can generate audio and video data to be streamed to conference platform 120. In some implementations, the audiovisual component can include a device (e.g., a microphone) to capture an audio signal representing speech of a user and generate audio data (e.g., an audio file) based on the captured audio signal. The audiovisual component can include another device (e.g., a speaker) to output audio data to a user associated with a particular client device 102A-N. In some implementations, the audiovisual component can also include an image capture device (e.g., a camera) to capture images and generate video data of the captured images.

In accordance with embodiments of the present disclosures, a video-based conference call refers to a conference call where respective client devices 102A-N associated with each participant of the conference call generates audio data (e.g., voice of the participant captured via a microphone of the respective client device) and video data (e.g., a video captured by a camera of the respective client device) during the conference call discussion. An audio-based conference call refers to a conference call where the respective client devices 102A-N associated with each participant of the conference call generates audio data and not video data during the conference call discussion. A hybrid conference call refers to a conference call where the respective client devices 102A-N associated with some participants to the conference call generates audio data and video data during the conference call (referred to as video participants herein), and the respective client devices 102A-N associated with other participants to the conference call generates audio data and not video data during the conference call (referred to as audio participants herein).

In some implementations, conference platform 120 can include a conference management component 122. Conference management component 122 is configured to manage a conference call between multiple users of conference platform 120. In some implementations, conference management component 122 can provide the UI to one or more client devices 102A-N to enable users to watch and/or listen to each other during a conference call. Conference management component 122 can also collect and provide information associated with the conference call to each participant of the call. For example, conference management component 122 can detect a particular user that is talking during the conference call and provide a notification to each client device associated with the conference call including an identifier of the particular user. In some instances, the conference management component 122 and/or components of each respective client device 102A-N can modify the conference UI, or the UI of another application running on the respective client device 102A-N, based on the notification.

As described previously, an audiovisual component of each client device can capture audio signals representing speech of a user and generate audio data based on the captured audio signal. For example, a participant to a conference call can provide a verbal phrase. The audiovisual component of the client device 102 associated with the participant can capture audio signals recognizing the verbal phrase provided by the participant and generate audio data (e.g., an audio file) based on the captured audio signal. In some embodiments, the audiovisual component of the client device 102 may initiate the recording and generation of audio data in response to detecting that a user associated with the client device 102 has interacted with one or more UI elements included in a UI (e.g., a conference UI or a UI of another application) provided via the client device 102. In other or similar embodiments, the audiovisual component of client device 102 may initiate the recording and generation of audio data in response to detecting that a user has interacted with an element of the client device 102. For example, the audiovisual component of client device 102 may initiate the recording and generation of audio data in response to detecting that a user has interacted with a button associated with a particular number of a keypad of the client device 102. In yet other or similar embodiments, the audiovisual component may initiate the recording and generation of the audio data in response to detecting that polling is initiated for a conference call discussion. Further details regarding the recording and generation of audio data are provided herein.

In some implementations, the client device 102 can transmit the generated audio data to conference management component 122. In some embodiments, conference management component 122 can generate, based on the received audio data, one or more text strings including verbal phrases provided by the participant. For example, conference management component 122 can convert an audio file received from a client device 102A-N into a file including the one or more text strings. Conference management component 122 can store the one or more text strings, or the file including the one or more text strings, at data store 110. In some embodiments, conference management component 122 can store the audio data (e.g., the received audio file) at data store 110 as well. In other or similar embodiments, client device 102 can generate one or more text strings including verbal phrases provided by the participant based on the generated audio data. In such embodiments, client device 102 can transmit the one or more text strings to conference management component 122 (with or without the audio file) and conference management component 122 can store the one or more text strings (and in some embodiments, the audio file) at data store 110, as described above.

In some embodiments, an audiovisual component of a client device 102 can generate audio data at multiple instances during the conference call. For example, each instance that a participant of the conference call provides a verbal phrase, the audiovisual component of the client device 102 associated with the participant can generate audio data based on the verbal phrase. Conference management component 122 and/or an application running at client device 102 can generate separate text strings that include each verbal phrase provided by a participant of the conference call as each verbal phrase is recorded at a respective client device 102. During or after completion of the conference call (e.g., after each participant of the call has ended a connection between a client device and the conference platform), conference management component 122 can generate a transcript of the conference call based on each separate generated text string. In other or similar embodiments, conference management component 122 can receive audio data generated for each participant (e.g., from each client device 102A-N) after completion of the conference call. In such embodiments, conference management component 122 can generate text strings that include verbal phrases provided by each participant of the conference call after completion of the conference call. Each text string generated after completion of the conference call may be included in a conference call transcript stored at data store 110. In some embodiments, a conference call transcript may be generated by conference management component 122.

Polling engine 151 can enable participants of the conference call to poll other participants during the conference call. A participant can poll other participants of a conference call by posing a question (referred to as a polling question 124) to the other participants to solicit responses (referred to as a polling answer 126) to the question 124. In some embodiments, a participant can verbally pose a question 124 for polling other participants of the conference call. For example, a conference UI provided by conference platform 120 can include a UI element that is configured to initiate polling of participants of the conference call (referred to as a polling question UI element herein). A participant of the conference call can interact with (e.g., engage) the polling question UI element (i.e., via the conference UI). The polling question UI element can be configured to cause the audiovisual component to initiate a recording function. Responsive to detecting that the participant has interacted with the polling question UI element, the audiovisual component of client device 102A-N associated with the participant may record a polling question that is verbally provided by the participant. In some embodiments, the audiovisual component can terminate the recording in response to detecting that the participant has finished providing the verbal question (e.g., the participant has disengaged the GUI element, the participant has re-engaged with the GUI element, etc.). In other or similar embodiments, the audiovisual component can terminate the recording in response to determining that a particular amount of time has passed since the participant initially interacted with the polling question UI element. Responsive to the audiovisual component terminating the recording, client device 102A-N can generate audio data associated with the verbal question provided by the participant. The client device 102A-N can transmit the audio data (and/or one or more text strings) that includes the verbal question to polling engine 151, in accordance with previously described embodiments. Polling engine 151 can determine, based on the message, that the verbal phrase corresponds to a polling question 124 and can provide the verbal question as a polling question 124 to other participants of the conference call, in accordance with embodiments provided herein.

In some embodiments, the participant can verbally provide the question 124 for polling other participants without interacting with a UI element. For example, the participant can provide one or more verbal phrases during a conference call. The audiovisual component of the client device 102A-N associated with the participant can generate audio data based on an audio signal recognizing the verbal phrases and can transmit the generated audio data to conference management component 122, in accordance with previously described embodiments. In some embodiments, conference management component 122 can provide the audio data to polling engine 151. In additional or alternative embodiments, conference management component 122 can generate one or more text strings including the verbal phrases and can provide the generated text strings to polling engine 151.

In some embodiments, polling engine 115 can provide the audio data and/or the text strings received from conference management component 122 as input to a trained machine learning model. The machine learning model can be trained to receive, as an input, one or more verbal phrases (e.g., as audio data and/or as one or more text strings) and provide, as output, a level of confidence that a verbal phrase includes a question associated with polling. In some embodiments, the machine learning model can be trained based on verbal phrases that have been previously provided by users of a platform for polling other users of the platform. The platform can receive the verbal phrases (e.g., as audio data, as a text string, etc.) from a client device and can store the received verbal phrases at data store 110, in some embodiments. For example, the platform can be a conference platform 120 and the platform can receive verbal phrases including questions that were used for polling from a client device, in accordance with previously described embodiments. In another example, the platform can be a collaboration platform (not shown) that is configured to enable users to prepare surveys for polling other users of the collaboration platform. A user can provide (e.g., via a UI provided by the collaboration platform) one or more questions to be included in the survey. The verbal phrases used to train the model can include the one or more user-provided questions to be included in the survey.

A training engine (not shown) can generate training data based on the previously provided verbal phrases at data store 110. The training data can include a set of training inputs and a corresponding set of target outputs. The set of training inputs can include a phrase (e.g., audio data, a text string) previously provided by a user of the platform and, in some embodiments, can include one or more attributes associated with the previously provided phrase. An attribute can include an indication of whether a respective previously provided phrase includes a question, a question type associated with the previously provided question, and so forth. If a respective training input includes audio data (e.g., an audio recording) for a previously provided phrase, the attributes associated with the training input can include an identifier for a portion of the audio recording (e.g., a timestamp) at which an inflection of a user's voice corresponds to a question (e.g., the user's inflection is elevated to a higher pitch). The set of target outputs can include data pertaining to whether each respective previously provided phrase of the set of training inputs includes a question that was previously used for polling.

The training engine can train a machine learning model using the generated training data. In some embodiments, a machine learning model can refer to the model artifact that is created by the training engine using the training data that includes the set of training inputs and the set of corresponding target outputs (i.e., the correct answers for respective training inputs). The training engine can find patterns in the training data that map the training input to the target outputs (i.e., the answer to be predicted), and provide the machine learning model that captures these patterns. In some embodiments, the machine learning model can be composed of, for example, a single level of linear or non-linear operations (e.g., a support vector machine (SVM) or a deep network, i.e., a machine learning model that is composed of multiple levels of non-linear operations). An example of a deep network is a neural network with one or more hidden layers and such a machine learning model can be trained by, for example, adjusting weights of a neural network in accordance with a backpropogation learning algorithm, or the like.

In response to providing the audio data and/or the text strings as input to the trained machine learning model, polling engine 151 can receive an output of the trained machine learning model and determine, based on the received output, whether a level of confidence for a verbal phrase satisfies a confidence criterion (e.g., whether the level of confidence for the verbal phrase exceeds a threshold level of confidence). In response to determining the level of confidence satisfies the confidence criterion, polling engine 151 can designate the verbal phrase as a polling question 124. Conference management component 122 can present the designated polling question 124 to the other participants of the conference call, in accordance with embodiments described herein.

Polling engine 151 can receive one or more answers 126 to a polling question 124 in response to presenting the polling question 124 to participants via the conference UI. For example, polling engine 151 and/or conference management component 122 can modify the conference UI to present a textual form of a polling question 124. Polling engine 151 and/or conference management component 122 can further modify the conference UI to include one or more UI elements that allow a participant to provide an answer 126 to the polling question 124. In some embodiments, the one or more UI elements can allow the participant to provide a verbal answer to the polling question 124. For example, a client device 102 associated with a participant of a conference call can detect that the participant has interacted with the UI element (e.g., has engaged with the UI element) and can cause an audiovisual component of the client device 102 to initiate a recording function, in accordance with previously described embodiments. In response to detecting that the participant has completed providing the verbal answer (e.g., the participant has disengaged the UI element and/or has re-engaged with the UI element, etc.), the client device 102 can terminate the recording function and can transmit the audio data associated with the verbal answer to conference management component 122. In other or similar embodiments, the one or more UI elements can allow the participant to provide other types of answers 126 to the polling question 124. For example, the one or more UI elements can include a text box that enables the user to provide a textual answer to the polling question 124. In another example, the one or more UI elements can enable the user to select a polling answer 126 from a set of polling answers 126 associated with the polling question 124. A client device 102 associated with the participant can transmit data (e.g., textual data, audio data, etc.) associated with a response provided by a participant (i.e., a verbal answer or a non-verbal answer) to polling engine 151, in accordance with previously described embodiments.

In some implementations, conference platform 120 can operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. In some implementations, the functions of conference platform 120 may be provided by a more than one machine. For example, in some implementations, the functions of conference management component 122 and polling engine 151 may be provided by two or more separate server machines. Conference platform 120 may also include a website (e.g., a webpage) or application back-end software that may be used to enable a user to connect with other users via the conference call.

In general, functions described in implementations as being performed by conference platform 120 can also be performed on the client devices 102A-N in other implementations, if appropriate. In addition, the functionality attributed to a particular component can be performed by different or multiple components operating together. Conference platform 120 can also be accessed as a service provided to other systems or devices through appropriate application programming interfaces, and thus is not limited to use in websites.

Although implementations of the disclosure are discussed in terms of conference platform 120 and users of conference platform 120 participating in a video and/or audio conference call, implementations can also be generally applied to any type of telephone call or conference call between users. Implementations of the disclosure are not limited to content sharing platforms that provide conference call tools to users.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the conference platform 120.

In situations in which the systems discussed here collect personal information about users, or can make use of personal information, the users can be provided with an opportunity to control whether conference platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the conference platform 120.

Figure 2:
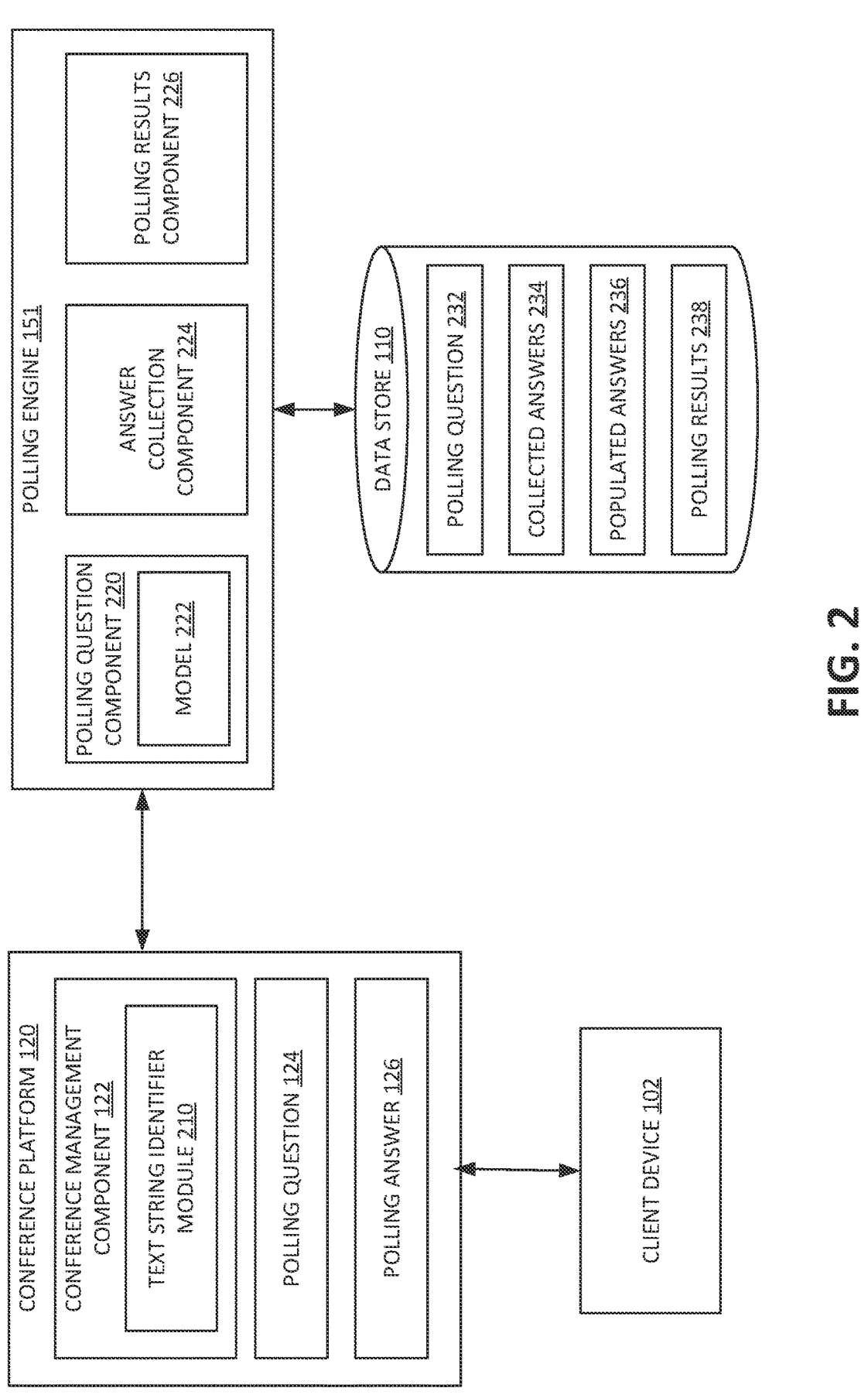
FIG. 2 is a block diagram illustrating a conference platform and a polling engine for the conference platform, in accordance with implementations of the present disclosure.

FIG. 2 is a block diagram illustrating a conference platform 120 and a polling engine 151, in accordance with implementations of the present disclosure. As described with respect to FIG. 1, conference platform 120 can provide tools to users of a client device 102 to join and participate in a video-based conference call, an audio-based conference call and/or a hybrid conference call. Conference platform 120 can include a conference management component 122. Conference management component 122 can include a text string identifier module 210. Polling engine 151 can facilitate polling of conference call participants. Polling engine can include a polling question component 220, an answer collection component 224, and a polling results component 226.

Figure 3A:
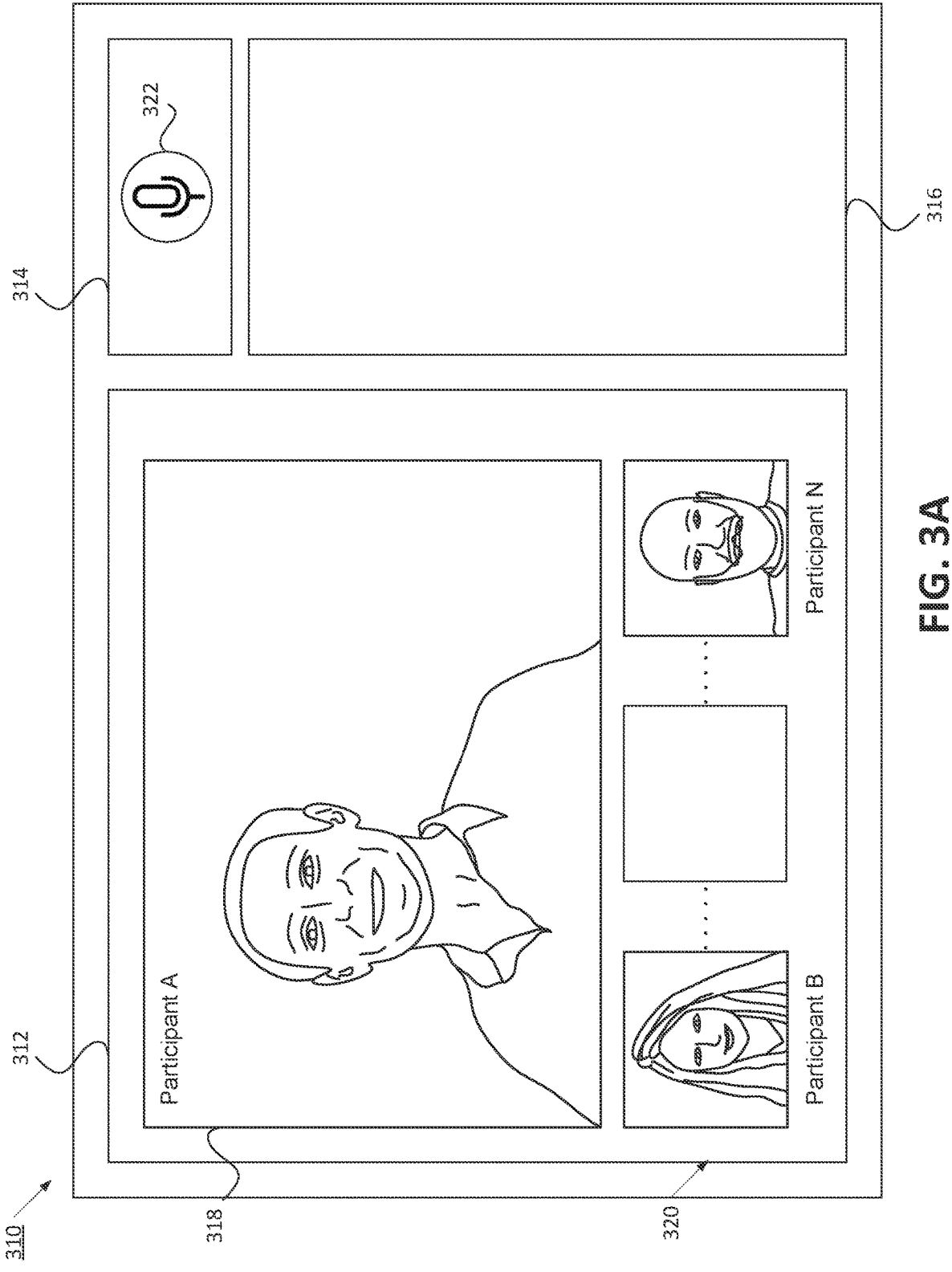
FIGS. 3A-3H illustrate audio-based polling via a user interface (UI) provided by a conference platform, in accordance with implementations of the present disclosure.

As described above, conference management component 120 can receive audio data and/or non-audio data from a client device 102. For example, during or after a conference call discussion (e.g., a video conference call discussion), conference management component 120 can receive an audio file from client device 102. The audio file can include a verbal phrase (e.g., a verbal question) provided by a participant of the conference call during the conference call discussion. FIG. 3A illustrates a video conference call between multiple participants via conference platform 120. As illustrated, conference management component 122 provides a UI 310 to enable participants (e.g., participants A-N) to join and participate in a conference call. UI 310 is described as a UI displayed via a client device 102 associated with Participant A of the conference call. However, it should be noted that UI 310 can displayed on a client device 102 associated with any participants to the conference call.

UI 310 can include multiple sections, including a first section 312, a second section 314, and/or a third section 316. In some embodiments, the first section 312 can include one or more portions for outputting video data captured at the client devices associated with each participant. For example, the first section 312 can include at least a first portion 318 and a second portion 320 that each display video data captured by user devices associated with participants of the video conference call. In some implementations, the first portion 318 of section 312 can display video data captured by a client device 102 associated with a participant that is providing verbal statements during the conference call (i.e., the participant that is currently speaking). Second portion 320 of section 312 can display video data captured by client devices 102 of participants (e.g., Participants B-N) that are not providing verbal statements during the conference call (i.e., are not currently speaking). In other or similar embodiments, section 312 can include one or more sections that are configured to display video data associated with participants in accordance with other orientations. For example, section 312 can include a single portion that displays the video data captured by client devices of a participant that is currently speaking and does not display video data captured by client devices of participants that are not currently speaking. In another example, section 312 can include multiple portions that each display video data associated with a participant of the video conference call, regardless of whether a participant is currently speaking.

The second section 314 of UI 310 can include a UI element 322 that is configured to enable a participant of the conference call to initiate polling of other conference call participants (referred to as polling question UI element 322 herein). A participant of the conference call can interact with UI element 322 to indicate that the participant wants to provide a question for polling the other conference call participants. In some embodiments, the participant (e.g., Participant A) can interact with UI element 322 by engaging with UI element 322 via UI 310. For example, Participant A can click on, tap on or otherwise select UI element 322 using a mouse, finger or another input/output (IO) component at or coupled to a client device 102 associated with Participant A. In response to detecting that Participant A has engaged with UI element 322, the client device 102 associated with Participant A (referred to as client device 102A, for purposes of example only) can cause an audiovisual component (e.g., a microphone) at or coupled to client device 102A to record audio provided by Participant A.

Figure 3B:
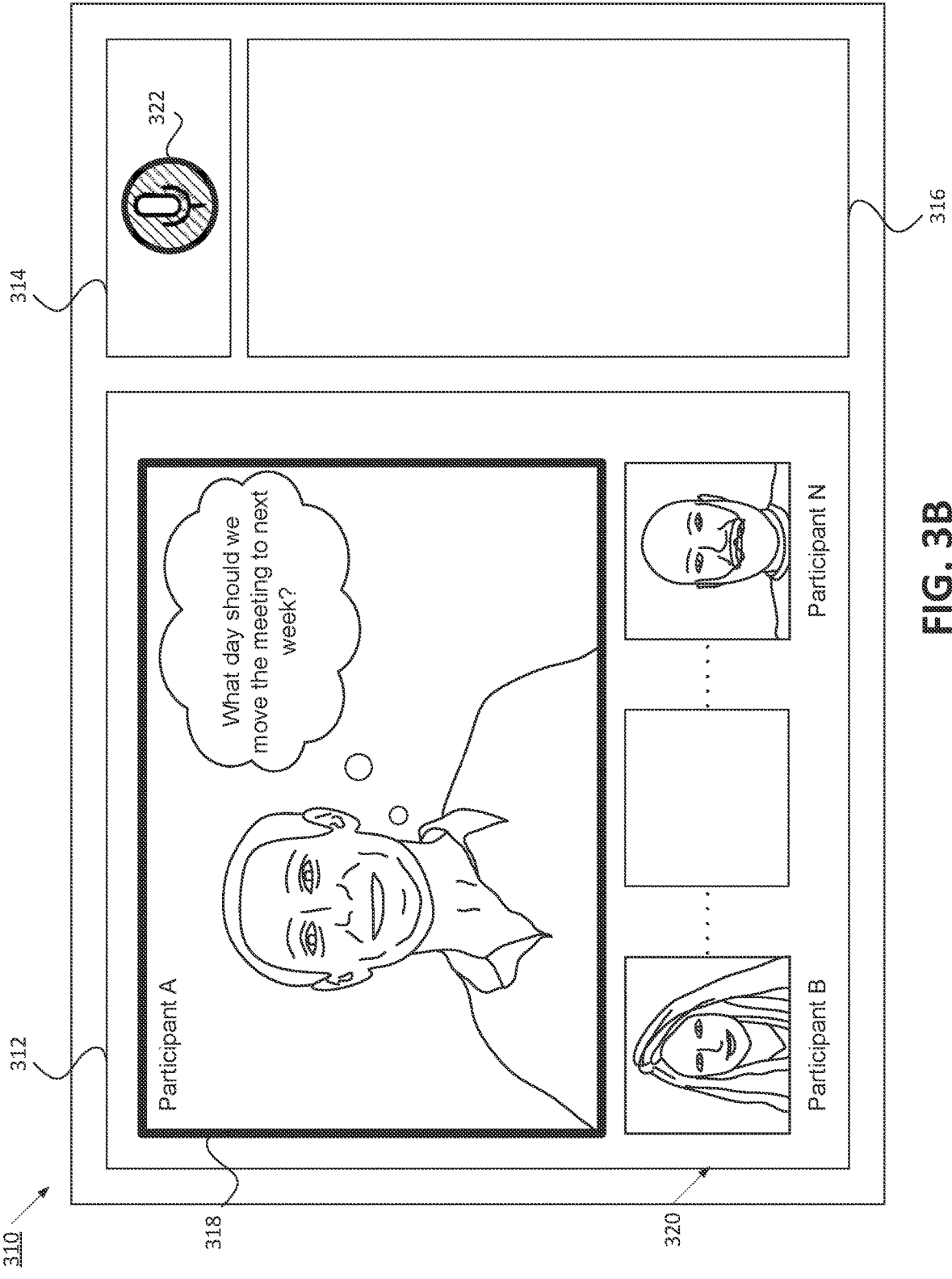

As illustrated in FIG. 3B, Participant A can engage with element 322 of UI 310. Responsive to detecting that Participant A has engaged with element 322, client device 102A can initiate a function to record audio provided by Participant A. During and/or after engaging with element 322, Participant A can verbally provide a question for polling Participants B-N of the conference call. For example, as illustrated in FIG. 3B, Participant A can verbally provide the question "What day should we move the meeting to next week?" The audiovisual component of client device 102A can capture an audio signal based on the audio provided by Participant A and generate audio data (e.g., an audio file) based on the captured audio signal. In some embodiments, client device 102A and/or conference management component 122 can detect that Participant A has finished providing the verbal question. For example, Participant A may have engaged with element 322 during the period of time at which the verbal question was provided (e.g., held element 322). Accordingly, client device 102A and/or conference management component 122 can detect that Participant A has finished providing the verbal question in response to detecting that Participant A has disengaged element 322 (e.g., released element 322). In another example, Participant A may have engaged with element 322 to initiate polling, but disengaged with element 322 prior to providing the verbal question (e.g., clicked on or otherwise selected element 322). Client device 102A and/or conference management component 122 can detect that Participant A has finished providing the verbal question in response to detecting that Participant A has re-engaged with element 322 (e.g., re-clicked element 322). In yet another example, client device 102A and/or conference management component 122 can detect that Participant A has finished providing the verbal question in response to determining that Participant A has not provided any audio within a particular interval of time (e.g., Participant A has been silent for a particular amount of time). In response to detecting that Participant A has finished providing the verbal question, client device 102A can terminate the recording of audio provided by Participant A. Client device 102A can, in some embodiments, convert an audio file including the recording of the verbal question into one or more text strings and transmit the one or more text strings, with or without the audio file, to conference platform 120. In other or similar embodiments, client device 102A can transmit the audio file including the recording to conference platform 120, as described above. In some embodiments, client device 102A can transmit a message with the audio file and/or the one or more text strings that indicates that the recoding was generated in response to detecting that Participant A engaged with element 322.

As described above, in some embodiments, Participant A can verbally provide a question for polling without interacting with a UI element of UI 310. For example, Participant A can provide the verbal phrase "What day should we move the meeting to next week?" The audiovisual component of client device 102A can capture an audio signal based on the verbal phrase and generate audio data based on the captured audio signal, in accordance with previously described embodiments. In some embodiments, client device 102A can transmit the audio data to conference platform 120, as described above. In other or similar embodiments, client device 102A can convert an audio file including the recording of the verbal phrase into one or more text strings and transmit the one or more text strings, with or without the audio file, to conference platform 120, as described above.

Referring back to FIG. 2, text string identifier module 210 of conference management component 122 can identify one or more text strings that correspond to a verbal phrase (e.g., a verbal question) provided during a conference call discussion. As described above, in some embodiments, a client device (e.g., client device 102A) can transmit an audio file including a recording of a verbal question provided by a participant (e.g., Participant A) of a conference call. In response to receiving the audio file, text string identifier module 210 can convert the audio file to one or more text strings that include a textual form of the verbal question. Responsive to converting the audio file to the one or more text strings, text string identifier module 210 can provide the one or more text strings to polling question component 220 of polling engine 151. As also described above, in some embodiments, a client device 102 can transmit one or more text strings that include a textual form of a verbal phrase to conference platform 120. In such embodiments, text string identifier module 210 may receive the one or more text strings and can provide the one or more received text strings to polling question component 220, as described above.

Polling question component 220 can be configured to determine whether a verbal phrase provided by a participant of a conference call corresponds to a polling question that is to be used for polling other participants of the conference call. In some embodiments, polling question component 220 can determine that a verbal phrase is to be used for polling other participants of the conference call based on an indication provided by the client device 102 that transmitted an audio file and/or one or more text strings to conference platform 120. For example, as described above, client device 102A can transmit a message with the audio file and/or the one or more text strings that indicates that a recording including a verbal question was generated in response to detecting that Participant A engaged with element 322. Element 322 of GUI 310 can be an UI element that is designated to initiate polling of participants of a conference call, as described above. Accordingly, polling question component 220 can determine that the verbal question provided by Participant A corresponds to a polling question that is to be used for polling other participants of the conference call.

In some embodiments, each of the one or more text strings provided to polling question component 220 by text string identifier 210 can correspond to the textual form of the verbal question provided by Participant A. For example, if Participant A engages element 322 prior to providing the verbal question and disengages and/or re-engages element 322 responsive to finishing the verbal question, the audio file generated by client device 102A may only include a recording of audio during the time period when Participant A provided the verbal question. In such embodiments, polling question component 220 can store each of the one or more text strings at data store 110 as polling question 232. In other or similar embodiments, a portion of the one or more text strings provided to polling question component 220 can correspond to the textual form of the verbal question and another portion of the one or more text strings can correspond to the textual form of another verbal phrase provided by participant A. For example, if Participant A engages element 322 prior to providing the verbal question and does not disengage and/or re-engage element 322 responsive to finishing the verbal question (e.g., if Participant A forgets to disengage and/or re-engage element 322), the audio file generated by client device 102A may include a recording of audio during the time period when Participant A provided the verbal question and audio of another time period after participant A provided the verbal question. In such embodiments, polling question component 220 can identify a portion of the one or more text strings that corresponds to the verbal question and extract the identified portion from the one or more text strings.

In some embodiments, polling question component 220 can identify the portion of the one or more text strings by identifying one or more components of the one or more text strings that correspond to a question. For example, polling question component 220 can parse through each of the one or more text strings and determine whether each component (e.g., word, phrase, etc.) of the one or more text strings corresponds to a question. Responsive to determining that a respective component of the one or more text strings corresponds to a question, polling question component 220 can identify a portion of the one or more text strings that includes the component as corresponding to the question. In other or similar embodiments, polling question component 220 can provide the one or more text strings as input to a machine learning model 222 that is trained to predict whether a given input phrase (e.g., included in a given set of text strings, included in an audio file, etc.) corresponds to a polling question. In additional or alternative embodiments, polling question component 320 can provide an audio file received from client device 102 as input the model 222. Polling question component 220 can identify, based on one or more outputs of the model 222, a portion of the one or more text strings that correspond to the verbal question. Further details regarding the machine learning model 222 are provided below. Responsive to extracting the portion of the one or more text strings that corresponds to the textual form of the verbal question, Polling question component 220 can store the extracted portion at data store 110 as polling question 232.

As described above, in some embodiments, a participant of a conference call can provide a question for polling without interacting with a UI element of a conference UI. In such embodiments, the audiovisual component of the client device 102 can generate audio data that includes a recording of one or more verbal phrases provided by the participant and the client device 102 can transmit the audio data (e.g., an audio file) and/or one or more text strings including a textual form of the one or more verbal phrases to conference platform 120, as described above. Polling question component 220 can obtain the audio file and/or the one or more text strings from conference management component 122, as described above, and can provide the one or more text strings and/or the audio file as input to model 222. Model 222 can be trained to predict whether a verbal phrase provided by a participant of a conference call that corresponds to a polling question 126. Model 222 can receive, as input, one or more text strings including verbal phrases provided by participants of a conference call and provide, as output, a level of confidence associated with the one or more text strings, the level of confidence indicating a likelihood that the one or more text strings includes a question for polling other participants of the conference call. In some embodiments, conference management component 122 can provide the audio data received from the client device associated with participant A as input to polling question model 220 in addition to or instead of the identified one or more text strings. For example, conference management component 122 can provide an audio file including an audio recording of the verbal phrase as input to polling question model 220, in accordance with previously described embodiments.

In response to providing the one or more identified text strings (or the audio file including the verbal phrase) as input to model 222, polling question component 220 can obtain, as an output, a level of confidence associated with verbal phrase. Polling question component 220 can determine whether the verbal phrase corresponds to a question for polling by determining whether the level of confidence associated with the verbal phrase satisfies a confidence criterion. In some embodiments, polling question component 220 can determine a level of confidence satisfies a confidence criterion in response to determining the level of confidence associated with the verbal phrase meets or exceeds a threshold level of confidence. In response to determining the level of confidence for the verbal phrase satisfies the confidence criterion, polling question component 220 can designate the verbal phrase as a question for polling other participants of the conference call. In response to designating the verbal phrase as a question for polling, polling question component 220 can store the designated polling question as polling question 232 at data store 110.

Figure 3C:
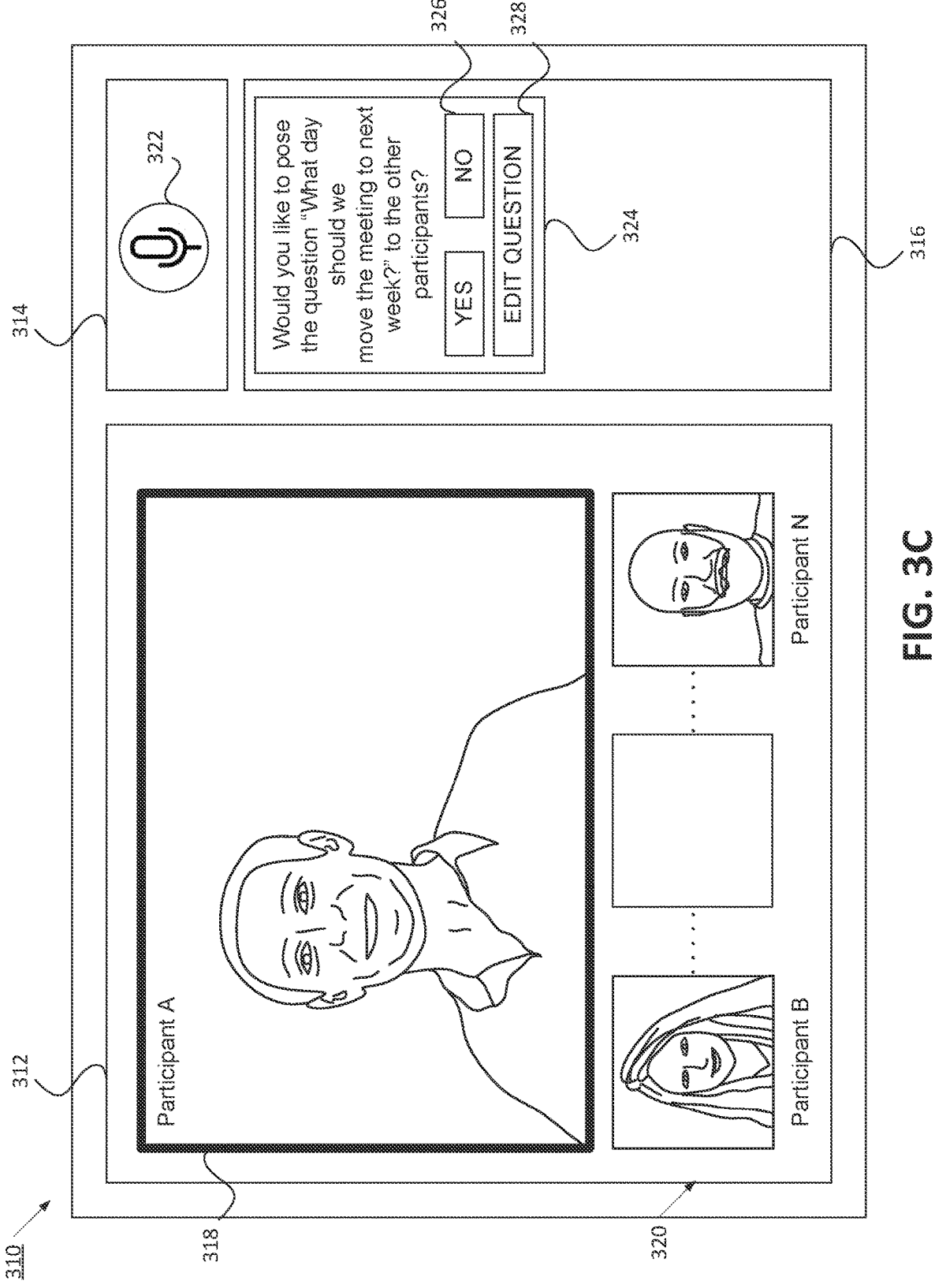

In some embodiments, polling question component 220 and/or conference management component 122 can generate and transmit, to a client device 102 associated with the participant that provided a verbal phrase that corresponds to poling question 232, a message inquiring whether the participant would like to pose the question to the other conference call participants. FIG. 3C illustrates a message provided to Participant A after polling question component 220 designates a verbal phrase provided by participant A (e.g., "What day should we move the meeting to next week?") as a question for polling. As illustrated, third section 316 of UI 310 can display a message 324 to Participant A inquiring whether Participant A would like to pose the question to the other participants (e.g., participants B-N) of the conference call. In some embodiments, message 324 can include one or more elements to enable Participant A to pose, or not pose, the designated question to the other participants. For example, message 324 can include one or more first elements 326 which enable Participant A to accept or decline posing the question to the other participants of the conference call. In response to receiving a notification that Participant A has interacted with an element 326 associated with accepting to pose the question to the other participants (e.g., the "YES" button in section 316 of UI 310), client device 102A can generate and transmit a notification to conference management component 122 indicating that Participant A would like to pose the designated question to the other participants. Conference management component 122 can pose the question to the other participants of the call, in accordance with embodiments described with respect to FIG. 3D. In response to receiving a notification that Participant A has interacted with an element 326 associated with declining to pose the question to the other participants (e.g., the "NO" button in section 316 of UI 310), client device 102A can generate and transmit a notification to conference management component 122 indicating that Participant A would not like to pose the designated question to the other participants of the conference call. Conference management component 122 can provide feedback to polling engine 151 and/or another component residing at system 100 (e.g., for further training of model 222).

In some embodiments, message 324 can include a second element 328 configured to enable Participant A to edit the designated polling question included in message 324. In response to receiving a notification that Participant A interacted with element 328, the client device associated with Participant A can provide an additional element (not shown) via the third section 316 of UI 310 configured to enable Participant A to edit one or more portions of the designated polling question. For example, the client device 102A can provide a text box in or around the third section 316 of UI 310 to enable Participant A to modify one or more words or phrases included in the designated polling question. In response to receiving a modification to a designated polling question, the client device can generate and transmit a notification to conference management component 122 including the modification to the polling question. Conference management component 122 can provide feedback to polling engine 151 and/or another component residing at system 100, in accordance with previously described embodiments.

Message 322 can include additional elements, in some embodiments. For example, message 324 can include an additional element (not shown), which enables Participant A to dismiss the message 324. In response to receiving a notification that Participant A interacted with the additional element, the client device associated with Participant A can remove message 324 from the third section 316 of UI 310. In some embodiments, client device 102A can generate and transmit a notification to conference management component 122 indicating that Participant A dismissed message 320. In response to receiving the notification, conference management component 122 can determine that the previously designated question did not correspond to a question for polling participants of the conference call and can provide feedback based on this determination to polling engine 151 and/or another component residing at system 100, in accordance with previously described embodiments.

Figure 3D:
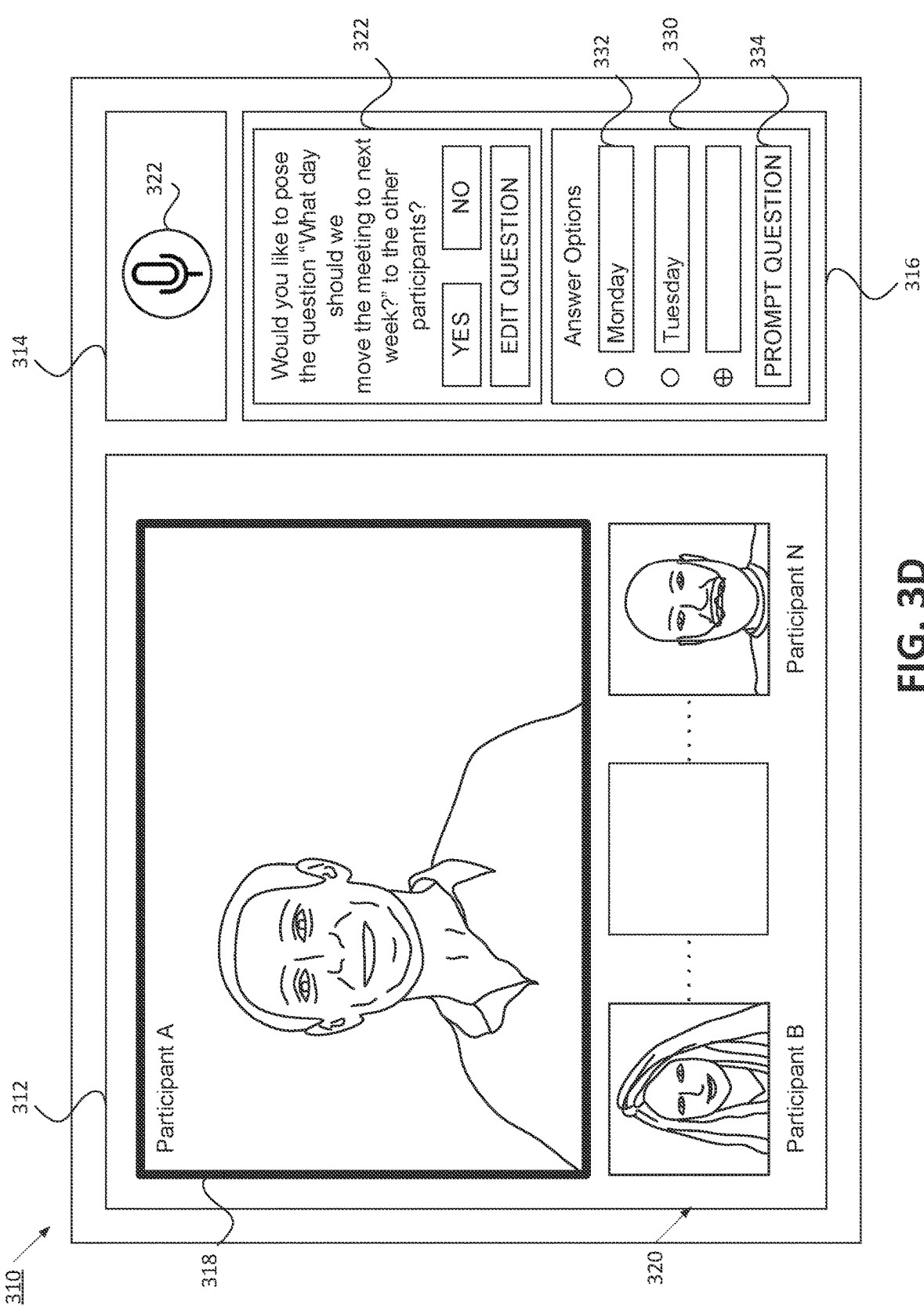

In some embodiments, in response to receiving an indication that Participant A interacted with element 326 (i.e., to indicate he or she would like to pose the designated polling question to the other participants of the conference call), the client device associated with Participant A can modify one or more portions of UI 310 to include an additional message 330. In some embodiments, the additional message 330 can enable a participant to customize one or more settings associated with posing the question to the other participants of the conference call. For example, as illustrated in FIG. 3D, message 330 provides, to Participant A, answer options that can be associated with the question posed to the other participants. As illustrated, message 330 includes one or more first elements 332 configured to enable Participant A to specify one or more answer options associated with the polling question. For example, Participant A can specify that the answer options associated with the polling question "What day should we move the meeting to next week?"

include "Monday" or "Tuesday." In some embodiments Participant A can specify the one or more answer options by interacting with the one or more first elements 332 of message 330. For example, Participant A can type or otherwise provide the one or more answer options via the one or more first elements 332 of message 330.

In other or similar embodiments, message 330 can include one or more additional elements (not shown) that enable Participant A to verbally provide the one or more answer options for the polling question. For example, Participant A can interact with (i.e., click) on the one or more additional elements and verbally provide the one or more answer options for the polling question. In response to determining Participant A has interacted with the one or more additional elements, client device 102A can generate audio data (e.g., an audio file) including one or more verbal phrases provided by Participant A, in accordance with previously described embodiments. In some embodiments, client device 102A can convert the audio data to one or more text strings including the verbal phrase. Client device 102A can parse the one or more text strings and identify one or more answers to the question included in the verbal phrase. In response to identifying the one or more answers to the question, client device 102A can modify message 330 to include each identified answer provided by Participant A. As described above, client device 102A can identify the one or more answers to the polling question. In other or similar embodiments, client device 102A can transmit a message to conference management component 122 including the audio data. Conference management component 122 can identify the one or more answers to the polling question and transmit the identified answers to client device 102A, in accordance with embodiments described herein.

In other or similar embodiments, message 330 can include answer options determined to be associated with the polling question (e.g., by conference management component 122), in accordance with previously described embodiments. It should be noted that, although embodiments of the present disclosure are directed to enabling Participant A to specify one or more answer options associated with the polling question, message 330 can include additional settings associated with the polling question that can be specified by Participant A. For example, message 330 can include an element to enable Participant A to specify particular participants to pose the question to.

Message 330 can include a second element 334 configured to enable Participant A to pose the question to one or more participants of the conference call. In response to receiving an indication that participant A has interacted with element 334, client device 102A can generate and transmit a notification to conference management component 122 indicating that Participant A would like to pose the question to other participants of the conference call. In some embodiments, the notification can include an indication of any modifications provided to the question and/or an indication of any settings (e.g., answer options) associated with the polling question.

It should be noted that although embodiments of the present disclosure provide that message 324 and/or message 330 are provided in section 316 of UI 310, message 324 and/or 330 can be provided in any section of UI 310. For example, message 324 and/or message 330 can be provided in first section 312 or second section 314 of UI 310. In another example, message 324 and/or message 330 can be provided in another section (not shown) of UI 310.

Referring back to FIG. 2, in some embodiments, conference management component 122 can provide the textual form of the verbal question provided by Participant A to the one or more other participants of the conference call (e.g., Participants B-N). In some embodiments, conference management component 122 can retrieve polling question 232 from data store 110 and can provide polling question 232 as polling question 124 via the conference UI on one or more client devices 102 associated with other participants (e.g., Participants B-N) of the conference call. In some embodiments, conference management component 122 can provide polling question 124 in response to polling question component 220 designating a verbal phrase or verbal question provided by Participant A as a polling question. In other or similar embodiments, conference management component 122 can provide polling question 124 to the other participants in response to receiving a notification from client device 102A that Participant A wants to pose the verbal phrase or verbal question as a polling question, as described above.

Figure 3E:
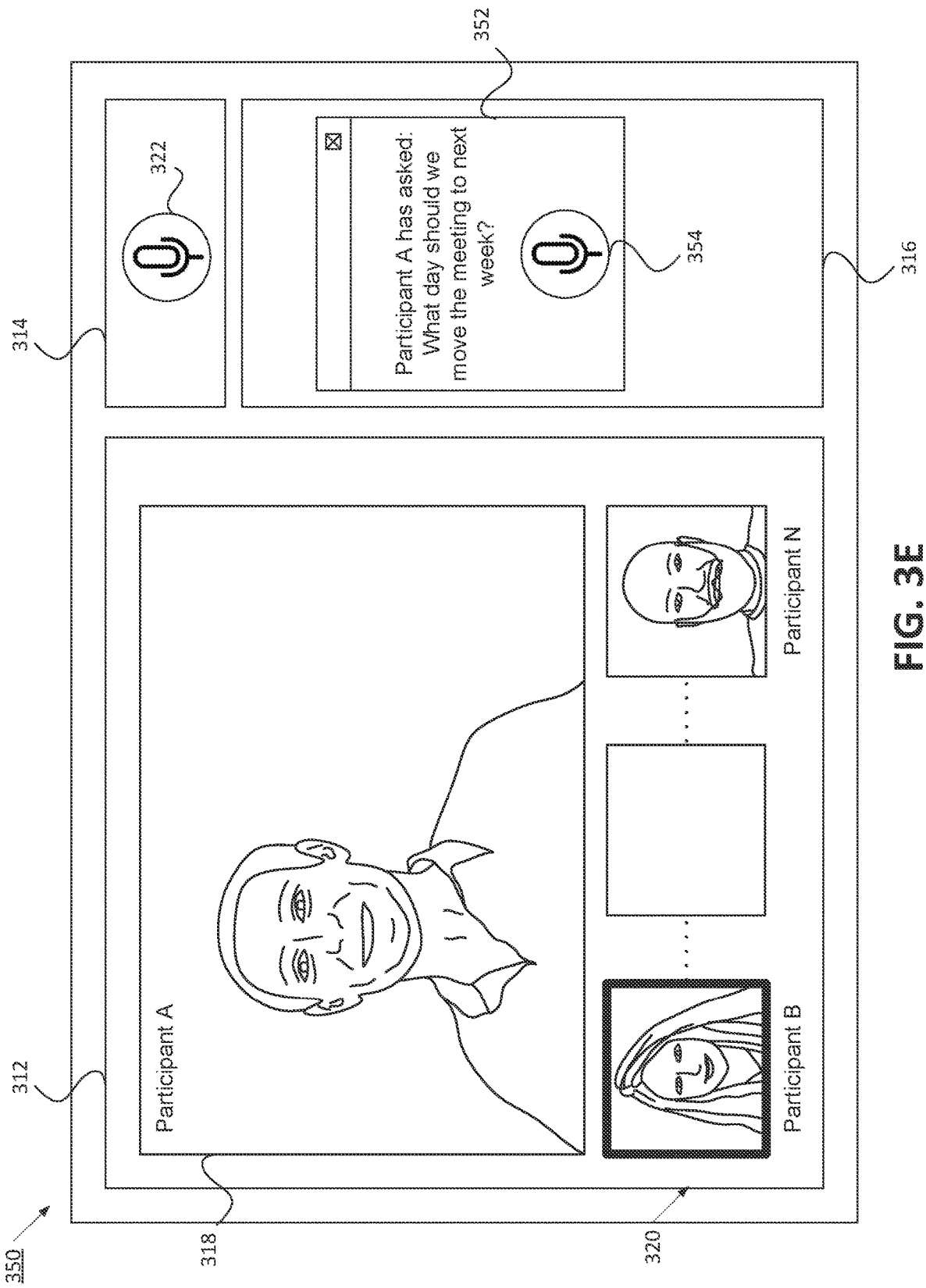

Conference management component 122 can cause a UI on each client device associated with the other participants of the conference call (e.g., Participants B-N) to display a message including polling question 124. FIG. 3E illustrates an example UI 350 provided via a client device associated with Participant B of the conference call. As illustrated, the client device associated with Participant B (referred to as client device 102B, for purposes of example only) updates section 316 of UI 350 to include a message 352. Message 352 can include an indication of polling question 124 (e.g., "What day should we move the meeting to next week?"). In some embodiments, message 352 can include one or more UI elements 354 configured to enable Participant B to provide a response to polling question 124. For example, UI element 354 can allow Participant B to provide a verbal answer to polling question 124. In response to detecting that Participant B has interacted with (e.g., engaged with) element 354, client device 102B can initiate a recording operation to generate audio data (e.g., an audio file) for the provided verbal answer, in accordance with previously described embodiments. In some embodiments, client device 102B can transmit the audio data associated with the provided verbal answer to conference platform 120. In other or similar embodiments, client device 102B can generate one or more text strings including the textual version of the provided verbal answer and transmit the one or more text strings to conference platform 120, as previously described. In some embodiments, client device 102B can also transmit a message to conference management component 122 indicating that the provided verbal answer corresponds to an answer phrase, as the verbal phrase was provided in response to Participant B interacting with element 354 and/or UI 350 presenting polling question 232.

In other or similar embodiments, Participant B can provide a verbal answer to polling question 124 by engaging with element 322 included in section 314 of UI 310. In response to detecting that Participant B has interacted with element 322, client device 102B can cause an audiovisual component of client device 102B to record a verbal phrase provided by Participant B, in accordance with previously described embodiments. Client device 102B can generate audio data (e.g., an audio file) associated with the recording, or can convert the audio data to one or more text strings including a textual form of the verbal phrase, and can transmit the audio data and/or the one or more text strings to conference management component 122, in accordance with previously described embodiments. Client device 102B can also transmit a message indicating that the verbal phrase was provided in response to Participant B interacting with element 322.

Referring back to FIG. 2, conference management component 122 can receive the audio file and/or the one or more text strings associated with the verbal answer provided by Participant B. In some embodiments, text string identifier module 210 can convert the audio file to one or more text strings including a textual form of the verbal answer. In other or similar embodiments, text string identifier module 210 can identify the one or more text strings generated by client device 102B. Text string identifier module 210 can determine whether the verbal phrase associated with the one or more text strings corresponds to an answer phrase. For example, text string identifier module 210 can parse each text string and determine whether a context of the text string corresponds with a context of an answer phrase. In another example, text string identifier module 210 can determine that the provided verbal answer corresponds to an answer phrase based on the received message from client device 102A (e.g., indicating that the verbal phrase was provided in response to Participant B interacting with element 354 and/or UI 350 presenting polling question 232).

As described above, conference management component 122 can receive the audio data and/or one or more text strings from client device 102B in response to Participant B interacting with element 322. In some embodiments, text string identifier module 210 may determine that the verbal phrase corresponds to a polling answer and not a polling question in response to determining that Participant B engaged with element 322 after message 350 was provided via UI 350. In other or similar embodiments, text string identifier module 210 may transmit a message to client device 102B inquiring whether Participant B intended to provide a response to polling question 124 or provide a new polling question 124. Client device 102B may provide the message to Participant B via UI 350 (not shown). In some embodiments, client device 102B may also provide one or more UI elements that enable Participant B to respond to the inquiry. For example, client device 102B may provide a first UI element that enables Participant B to indicate that he, she, or they intended to provide the verbal phrase as a response to polling question 124. Client device 102B may provide a second UI element that enables Participant B to indicate that he, she, or they intended to provide the verbal phrase as a new polling question 124. In response to detecting that Participant B has engaged with the first UI element or the second UI element, client device 102B can generate and transmit a notification to conference management component 122 that indicates the response. Text string identifier module 210 can determine whether the provided verbal phrase corresponds to an answer phrase based on the indicated response.

In response to determining the provided verbal answer corresponds to an answer phrase, text string identifier module 210 can provide the one or more text strings including the verbal answer to polling answer component 224 of polling engine 151. Polling answer component 224 can store the provided verbal answer as a collected answer 234 at data store 110. In some embodiments, polling answer component 224 can determine whether a textual form of the provided verbal answer is to be presented to one or more additional participants of the conference call as a candidate answer for polling question 232. Polling answer component 224 can determine that the provided verbal answer is to be presented to the additional participants in response to determining that the provided verbal answer satisfies an answer criterion. A provided answer can satisfy the answer criterion in response to polling answer component 224 determining that the number of participants of the conference call that provided a corresponding answer satisfies a threshold number. For example, in response to the polling question "What day should we move the meeting to next week?" Participant B can provide the verbal answer of "Wednesday." Polling answer component 224 can determine, based on collected answers 234, a number of additional participants of the conference call that also provided an answer (verbal or non-verbal) of "Wednesday." In response to determining that the total number of answers that correspond to the answer "Wednesday" satisfies a threshold number, polling answer component 224 can determine that the textual form of the provided verbal answer is to be presented to one or more participants of the conference call (only additional participants or alternatively one or more additional participants as well as Participant B). In some embodiments, polling answer component 224 can determine that the provided verbal answer is to be presented to the participants in response to receiving the one or more text strings including the verbal answer and without determining whether the verbal answer satisfies the answer criterion.

In some embodiments, polling answer component 224 can determine one or more additional answer candidates to be presented to the additional participants with the provided verbal answer. For example, polling answer component 224 can determine that a context of the verbal answer provided by Participant B ("Wednesday") corresponds to a day of the week. Polling answer 222 can determine, based on the answer context, that answers to the polling question correspond to a particular day of the week and can designate the polling question as a "day of the week" type question. In response to designating the polling question as a "day of the week" type question, polling answer component 224 can determine one or more answer candidates that correspond to a "day of the week: type question (e.g. Monday, Tuesday, Thursday, Friday, etc.). Polling answer component 224 can determine the one or more answer candidates are to be presented to the participants with the verbal answer and can store the answer candidates as populated answers 236 at data store 110.

Figure 3F:
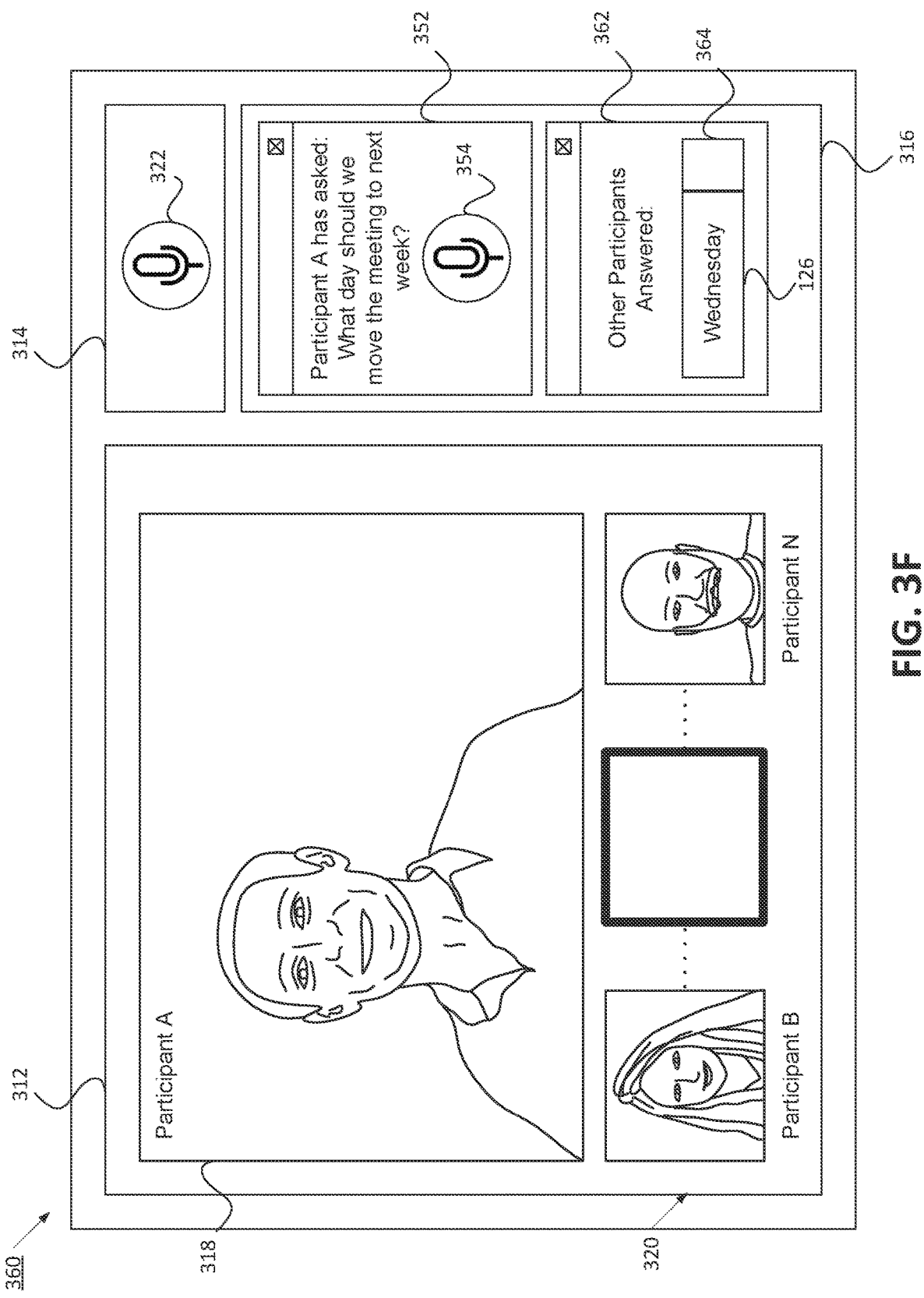
Figure 3G:
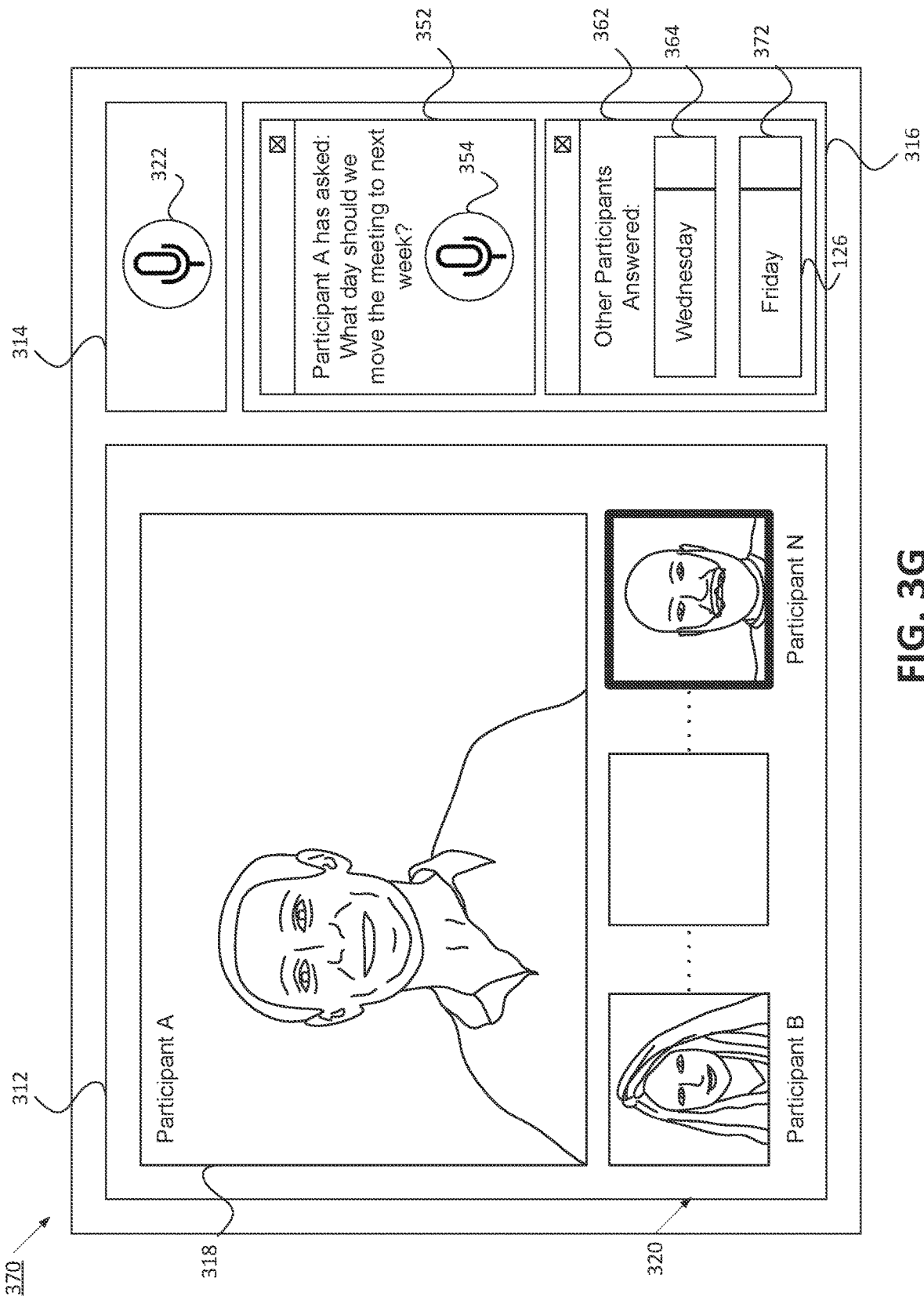

FIGS. 3F-3G illustrate sample UIs populating, for additional participants of the conference call, answers to the polling question based on the verbal answer(s) previously provided by other participant(s), in accordance with implementations of the present disclosure.

FIG. 3F illustrates a sample UI 360 for Participant C responding to a polling question during the conference call. As illustrated, in response to polling answer component 224 determining the verbal answer provided by Participant B is to be presented to additional participants of the conference call, conference management component 122 causes UI 360 to present a message 362 including the textual form of the polling answer 126 at section 316. In some embodiments, section 316 also includes a GUI element 364 that allows Participant C to provide a non-verbal answer to the polling question. It should be noted that message 362 and/or GUI element 364 can be provided in a different section from section 316 of UI 330. Participant C can interact with GUI element 364 to provide a non-verbal answer to the polling question that corresponds with the verbal answer. For example, GUI element 364 can be a button element that Participant C can select in order to provide a non-verbal answer that corresponds with the answer of "Wednesday." Alternatively, GUI element 364 can be a check box, a button or another UI element that allows a participant to confirm that the generated text (e.g., "Wednesday") is their answer to the polling question or in some implementations, to reject the generated text (e.g., "Wednesday") as their answer to the polling question. In some implementations, GUI element 364 is an element located separately from or next to the UI element displaying the generated text (e.g., "Wednesday"). In some embodiments, message 362 can also include the textual form of each answer candidate identified by polling component 224 (not shown), in accordance with previously described embodiments, and one or more additional UI elements that allow Participant C to provide a non-verbal answer corresponding with an answer candidate.

Additionally or alternatively, Participant C can interact with UI element 322 and/or UL element 354 to provide a verbal answer to the polling question. For example, Participant C may want to provide a different answer than the answer option (i.e., answer 126, answer candidates (not shown)) included in message 362. As such, Participant C can provide a verbal answer to the polling question by interacting with UI element 322 and/or UI element 354, in accordance with previously described embodiments. In other or similar embodiments, Participant C can interact with an additional GUI element (not shown) to provide a non-verbal answer to the polling question (e.g., type a non-verbal answer in a text box element). A client device associated with Participant C (referred to as client device 102C, for purposes of example only) can transmit data associated with the provided answer (verbal or non-verbal) to conference platform 120, as described previously.

Conference management component 122 can receive data associated with an answer (verbal or non-verbal) provided by Participant C, in accordance with previously described embodiments. In some embodiments, polling answer component 122 can determine that the answer provided by Participant C is to be presented to additional participants of the conference call. For example, Participant C can provide an answer of "Friday" to the polling question. In some embodiments, polling answer component 122 can determine that the provided answer satisfies an answer criterion and is to be presented to additional participants of the conference call, in accordance with previously described embodiments.

FIG. 3G illustrates a sample UI 370 for Participant N responding to a polling question during the conference call, in accordance with some implementations. As illustrated, in response to polling answer component 122 determining that the answer provided by Participant C satisfies the answer criterion, conference management component 122 causes a section of UI 370 include a textual form of the answer 126 (verbal or non-verbal). For example, answer 126 can be provided in message 362 at section 316. In some embodiments, section 316 (or another section of UI 370) also includes a UI element 372 that allows Participant D to provide a non-verbal answer to the polling question, in accordance with previously described embodiments. Additionally or alternatively, Participant D can interact with an additional UI element (e.g., UI element 322, UI element 354, etc.) to provide a different answer to the polling question, as previously described.

In some implementations, GUI elements 364 and 372 can be provided as check boxes, buttons or other type of UI element that allow a participant to confirm that the generated text (e.g., "Wednesday" or "Friday") is their answer to the polling question (or optionally to reject the generated text (e.g., "Wednesday" and/or "Friday") as their answer to the polling question). In some implementations, GUI elements 364 and 372 are elements located separately from or next to respective UI elements displaying the generated text (e.g., "Wednesday" and "Friday").

Figure 3H:
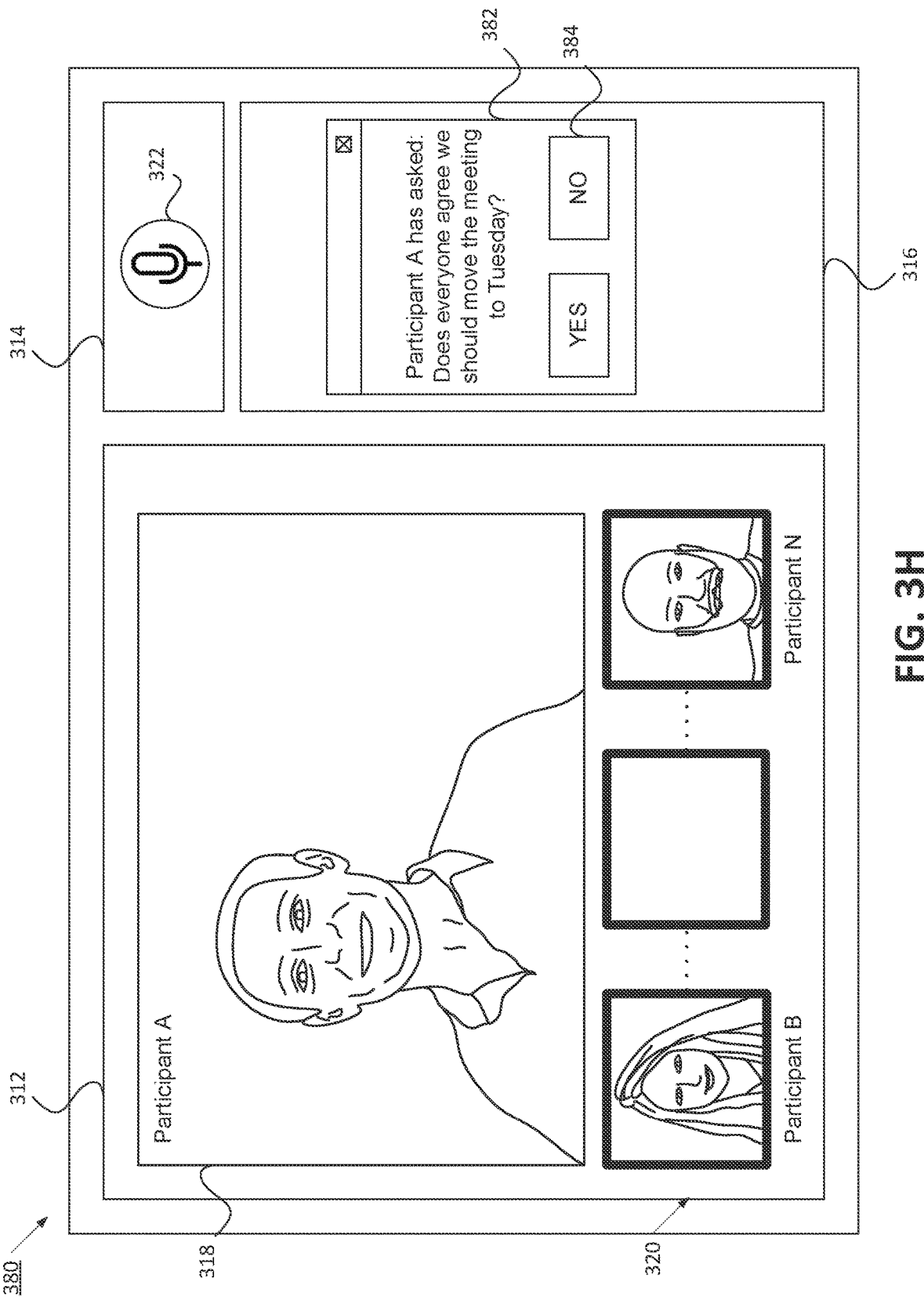

FIG. 3H illustrate another example UI 380 provided via client device 102B. As illustrated in FIG. 3H, client device 102B can update section 316 of UI 380 to include a message 382, in accordance with previously described embodiments. Message 382 can include an indication of polling question 124 (e.g., "Does everyone agree we should move the meeting to Tuesday?") and one or more UI elements 384 configured to enable Participant B to provide a response to polling question 124. Each element of message 382 can correspond to a specified answer option provided by Participant A, in accordance with previously described embodiments. For example, as illustrated in FIG. 3H, message 382 can include an element 384 associated with a response corresponding to an answer "yes," and another element 384 associated with a response corresponding to an answer "no." Participant B can provide a response of "yes" or "no" by interacting with a respective element. In other or similar embodiments, message 382 does not include one or more elements associated with a specified answer option provided by Participant B. In such embodiments, message 382 can include one or more elements (not shown) configured to enable Participant B to provide a customized answer to the polling question. For example, message 382 can include a text box configured to enable Participant B to type a customized answer to polling question 124. In response to detecting that Participant B has provided a response to the polling question 124 (e.g., has interacted with an element 384, etc.), client device 102B can generate and transmit a notification indicating the response to the polling question provided by Participant B to conference management component 102.

In other or similar embodiments, Participant B can interact with element 322 included in section 314 of UI 380 to provide a response to polling question 124. In response to detecting that Participant B has interacted with element 322, client device 102B can cause an audiovisual component of client device 102B to record a verbal phrase provided by Participant B, in accordance with previously described embodiments. Client device 102B can generate audio data (e.g., an audio file) associated with the recording and can transmit the audio data to conference management component 122, in accordance with previously described embodiments.

Referring back to FIG. 2, answer collection component 224 of polling engine 151 can receive the answers 126 to polling question 124 provided by participants of the conference call, in accordance with previously described embodiments. As each answer 126 is received, answer collection component 222 can generate a mapping between the polling question 124 and the collected answer 126 and store the mapping at data store 110.

During the conference call, polling question component 222 can designate one or more verbal phrases provided by participants of the conference call as polling questions 232 and answer collection component 222 can collect answers to the polling questions provided by participants of the conference call. During or after the conference call, polling results component 226 can generate results for each polling question stored at data store 110. For example, polling results component 226 can identify each polling question 232 at data store 110 and each collected answer 234 associated with each polling question 232. Polling results component 226 can analyze each collected answer for each polling question 232 and generate data associated with each polling question 232 based on the analysis. The generated data can be stored as polling results 238 at data store 110. In some embodiments, the generated data can include a number of participants that provided a particular answer to the polling question. In accordance with the previously provided example, polling results component 226 can determine a number of participants that answered "yes" and "no" to the polling question "Does everyone agree we should move the meeting to Tuesday?" In other or similar embodiments, polling results 238 can include data associated with participants that provided particular answers. For example, polling results component 226 can determine that a particular portion of participants that answered "yes" to the polling question are associated with particular characteristics (e.g., identified via a profile associated with each participant). In response to the polling results component 226 generating polling results 238, conference management component 122 can provide polling results 238 to a client device 102 associated with one or more participants of the conference call. For example, conference management component 122 can provide polling results 238 to client device associated with Participant A and/or an organizer of the conference call.

FIG. 4 depicts a flow diagram of a method 400 for designating a verbal phrase provided during a conference call as a polling question, in accordance with implementations of the present disclosure. Method 400 may be performed by processing logic that may include hardware (circuitry, dedicated logic, etc.), software (e.g., instructions run on a processing device), or a combination thereof. In one implementation, some or all the operations of method 400 may be performed by one or more components of system 100 of FIG. 1.

At block 410, processing logic provides a UI to participants of a video conference call. The UI enables one of the participants to verbally provide a question for polling of one or more additional participants of the conference call. In some embodiments, the UI includes a polling question UI element that is configured to initiate verbal polling of the participants of the conference call. At block 412, processing logic receives, via the UI, an indication that a first participant of the video conference call is to provide a verbal question. In some embodiments, receiving the indication that the first participant is to provide the verbal question includes detecting, by the processing logic, that the first participant has interacted with the polling question UI element.

At block 414, processing logic records the verbal question provided by the first participant. In some embodiments, processing logic causes an audiovisual component (e.g., a microphone) of a client device associated with the first participant to initiate a recording function. As the recording function is performed, the audiovisual component can capture audio signals associated with the verbal question. The client device can generate audio data (e.g., an audio file) associated with the recording, in some embodiments. At block 416, processing logic receives, via the UI, an indication that the first participant has finished providing the verbal question. In response to receiving the indication that the first participant has finished providing the verbal question, processing logic can cause the audiovisual component of the client device to terminate the recording function. In some embodiments, receiving the indication that the first participant has finished providing the verbal question includes detecting, by the processing logic, that the first participant has released the polling question UI element.

At block 418, processing logic optionally determines that the verbal question is to be used for polling of one or more second participants of the video conference call. In some embodiments, processing logic can determine that the verbal question is to be used for polling of the second participants of the conference call in response to determining that the first participant engaged with the polling question UI element. In other or similar embodiments, processing logic can determine that the verbal question is to be used for polling by providing a textual form of the verbal question (e.g., via a conference UI) to the first participant. Processing logic can detect that the first participant has engaged with a UI element via the conference UI that confirms the intent of the first participant to pose the verbal question as a polling question to the one or more second participants.

At block 420, processing logic provides a textual form of the verbal question to the one or more second participants of the conference call in the UI. In some embodiments, processing logic can convert an audio file including the recording of the verbal question into one or more text strings and identify the textual form of the verbal question from the one or more text strings. Processing logic can provide to the one or more second participants, with the textual form of the verbal question, an additional UI element that allows each of the one or more second participants to provide a verbal answer to the verbal question. In some embodiments, processing logic can receive, via the UI, an indication that at least one of the second participants is to provide a verbal answer to the verbal question. In response to receiving the indication, processing logic can record the verbal answer provided by the second participant, as described above. In response to receiving an indication that the second participant has finished providing the verbal answer, processing logic can provide a textual form of the verbal answer to the first participant, an organizer of the video conference call, or another second participant of the plurality of second participants in the UI.

Figure 5:
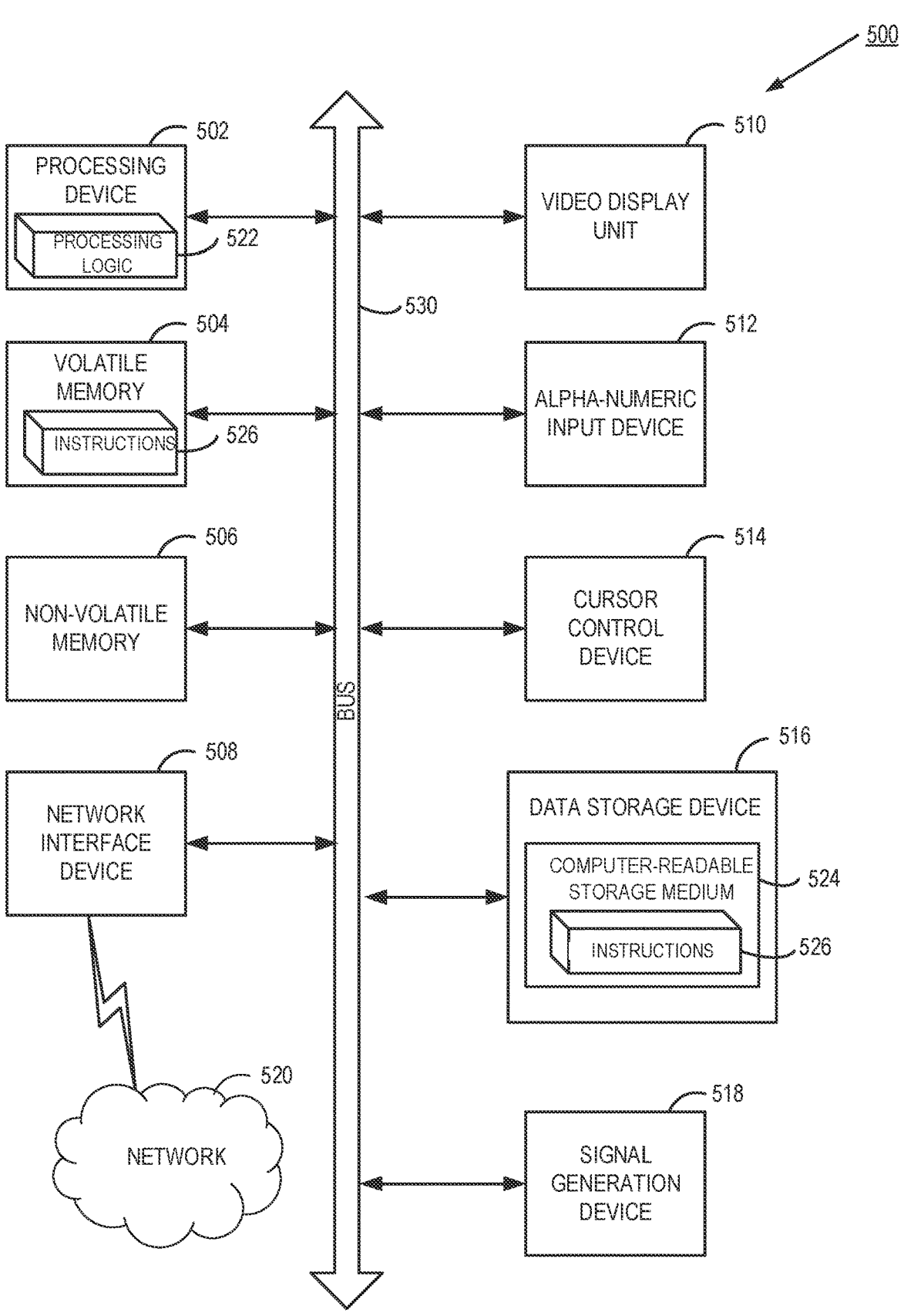
FIG. 5 is a block diagram illustrating an exemplary computer system, in accordance with implementations of the present disclosure.

FIG. 5 is a block diagram illustrating an exemplary computer system, in accordance with implementations of the present disclosure. The computer system 500 can be the conference platform 120 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for predicting channel lineup viewership) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for enabling polling of participants of a conference call) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for populating answers to polling questions based on initial responses. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

obtaining one or more content streams from a client device associated with a participant of a plurality of participants during a conference call, wherein the one or more content streams indicate verbal phrases provided by the participant during an ongoing discussion between the plurality of participants during the conference call;

feeding the one or more content streams as input to a machine learning model trained to determine a semantic context associated with verbal phrases included in given content streams and predict, based on the determined context, whether the verbal phrases comprise polling questions for polling conference call participants;

determining, based on one or more outputs of the machine learning model, a polling question for polling other participants of the plurality of participants and one or more answer options corresponding to the polling question; and providing the polling question and the one or more answer options for polling the other participants via one or more client devices associated with the other participants.

2. The method of claim 1, wherein obtaining the one or more content streams from the client device associated with the participant comprises:

receiving, via a user interface (UI) of the client device, an indication that the participant is to provide the verbal phrases; and responsive to receiving the indication, initiating a recording of the verbal phrases provided by the participant.

3. The method of claim 2, wherein the UI of the client device comprises a polling UI element that is associated with initiating verbal polling of the plurality of participants, and wherein the indication that the participant is to provide the verbal phrases is received via the UI upon detection that the participant has interacted with the polling UI element.

4. The method of claim 1, wherein providing the polling question and the one or more answer options for polling the other participants via the one or more client devices comprises:

updating a user interface (UI) of the one or more client devices to include a textual form of the polling question and the one or more answer options.

5. The method of claim 1, further comprising:

extracting audio data from the one or more content streams obtained from the client device, wherein the audio data comprises one or more audio signals representing the verbal phrases provided by the participant, and wherein the extracted audio data is fed as the input to the machine learning model.

6. The method of claim 1, further comprising:

converting an audio file comprising audio data of the one or more content streams into one or more text strings representing a textual version of the verbal phrases provided by the participant, wherein the one or more text strings are fed as the input to the machine learning model.

7. The method of claim 1, further comprising:

obtaining one or more additional content streams from at least one of the one or more client devices associated with the other participants, wherein the one or more additional content streams indicate verbal phrases provided by an additional participant in response to the polling question; and updating at least one of the polling question or the one or more answer options provided for polling the other participants based on the obtained one or more additional content streams.

8. The method of claim 1, wherein the machine learning model was trained on a corpus of historical data associated with one or more users of a platform, the historical data comprising at least one of: audio data associated with one or more historical verbal phrases provided by the one or more users or historical polling data indicating one or more historical polling questions used for historical polling of other users of the platform.

9. A system comprising:
a memory device; and
a processing device coupled to the memory device, the processing device to perform operations comprising:
obtaining one or more content streams from a client device associated with a participant of a plurality of participants during a conference call, wherein the one or more content streams indicate verbal phrases provided by the participant during an ongoing discussion between the plurality of participants during the conference call;
feeding the one or more content streams as input to a machine learning model trained to determine a semantic context associated with verbal phrases included in given content streams and predict, based on the determined context, whether the verbal phrases comprise polling questions for polling conference call participants;
determining, based on one or more outputs of the machine learning model, a polling question for polling other participants of the plurality of participants and one or more answer options corresponding to the polling question; and
providing the polling question and the one or more answer options for polling the other participants via one or more client devices associated with the other participants.

10. The system of claim 9, wherein obtaining the one or more content streams from the client device associated with the participant comprises:
receiving, via a user interface (UI) of the client device, an indication that the participant is to provide the verbal phrases; and
responsive to receiving the indication, initiating a recording of the verbal phrases provided by the participant.

11. The system of claim 10, wherein the UI of the client device comprises a polling UI element that is associated with initiating verbal polling of the plurality of participants, and wherein the indication that the participant is to provide the verbal phrases is received via the UI upon detection that the participant has interacted with the polling UI element.

12. The system of claim 9, wherein providing the polling question and the one or more answer options for polling the other participants via the one or more client devices comprises:
updating a user interface (UI) of the one or more client devices to include a textual form of the polling question and the one or more answer options.

13. The system of claim 9, wherein the operations further comprise:

extracting audio data from the one or more content streams obtained from the client device, wherein the audio data comprises one or more audio signals representing the verbal phrases provided by the participant, and wherein the extracted audio data is fed as the input to the machine learning model.

14. The system of claim 9, wherein the operations further comprise:
converting an audio file comprising audio data of the one or more content streams into one or more text strings representing a textual version of the verbal phrases provided by the participant,
wherein the one or more text strings are fed as the input to the machine learning model.

15. The system of claim 9, wherein the operations further comprise:
obtaining one or more additional content streams from at least one of the one or more client devices associated with the other participants, wherein the one or more additional content streams indicate verbal phrases provided by an additional participant in response to the polling question; and
updating at least one of the polling question or the one or more answer options provided for polling the other participants based on the obtained one or more additional content streams.

16. A non-transitory computer readable storage medium comprising instructions for a server that, when executed by a processing device, cause the processing device to perform operations comprising:
obtaining one or more content streams from a client device associated with a participant of a plurality of participants during a conference call, wherein the one or more content streams indicate verbal phrases provided by the participant during an ongoing discussion between the plurality of participants during the conference call;
feeding the one or more content streams as input to a machine learning model trained to determine a semantic context associated with verbal phrases included in given content streams and predict, based on the determined context, whether the verbal phrases comprise polling questions for polling conference call participants;
determining, based on one or more outputs of the machine learning model, a polling question for polling other participants of the plurality of participants and one or more answer options corresponding to the polling question; and
providing the polling question and the one or more answer options for polling the other participants via one or more client devices associated with the other participants.

17. The non-transitory computer readable storage medium of claim 16, wherein obtaining the one or more content streams from the client device associated with the participant comprises:
receiving, via a user interface (UI) of the client device, an indication that the participant is to provide the verbal phrases; and
responsive to receiving the indication, initiating a recording of the verbal phrases provided by the participant.

18. The non-transitory computer readable storage medium of claim 17, wherein the UI of the client device comprises a polling UI element that is associated with initiating verbal polling of the plurality of participants, and wherein the indication that the participant is to provide the verbal phrases is received via the UI upon detection that the participant has interacted with the polling UI element.

19. The non-transitory computer readable storage medium of claim 16, wherein providing the polling question and the one or more answer options for polling the other participants via the one or more client devices comprises:

updating a user interface (UI) of the one or more client devices to include a textual form of the polling question and the one or more answer options.

20. The non-transitory computer readable storage medium of claim 16, wherein the operations further comprise:

extracting audio data from the one or more content streams obtained from the client device, wherein the audio data comprises one or more audio signals representing the verbal phrases provided by the participant, and wherein the extracted audio data is fed as the input to the machine learning model.

* * * * *